(12) United States Patent
Niu

(10) Patent No.: US 10,880,214 B2
(45) Date of Patent: *Dec. 29, 2020

(54) SERVICE ROUTING PACKET PROCESSING METHOD AND APPARATUS, AND NETWORK SYSTEM

(71) Applicant: Huawei Technologies Co., Ltd., Shenzhen (CN)

(72) Inventor: Lehong Niu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,570

(22) Filed: Apr. 23, 2019

(65) Prior Publication Data

US 2019/0253350 A1 Aug. 15, 2019

Related U.S. Application Data

(63) Continuation of application No. 14/975,369, filed on Dec. 18, 2015, now Pat. No. 10,277,508, which is a
(Continued)

(30) Foreign Application Priority Data

Jun. 20, 2013 (CN) .......................... 2013 1 0247638

(51) Int. Cl.
*H04L 12/28* (2006.01)
*H04L 12/741* (2013.01)
(Continued)

(52) U.S. Cl.
CPC .............. *H04L 45/74* (2013.01); *H04L 45/00* (2013.01); *H04L 45/64* (2013.01); *H04L 69/22* (2013.01)

(58) Field of Classification Search
USPC ....... 370/227, 217, 225, 228, 351, 392, 216, 370/219, 220, 221, 238, 242, 252, 254,
(Continued)

(56) References Cited

U.S. PATENT DOCUMENTS 8,520,556 B2 * 8/2013 Karuppiah .......... H04L 12/1836
370/256
8,855,071 B1 * 10/2014 Sankaran .............. H04W 76/11
370/329
(Continued)

FOREIGN PATENT DOCUMENTS

CN 102025590 A 4/2011
CN 102098353 A 6/2011
(Continued)

OTHER PUBLICATIONS

Quinn, P., et al., "Network Service Header; draft-quinn-nsh-oo.txt", Jun. 13, 2013, pp. 1-20, XP015090587.

*Primary Examiner* — Phuongchau Ba Nguyen
(74) *Attorney, Agent, or Firm* — Slater Matsil, LLP

(57) ABSTRACT

A service routing packet processing method and apparatus. The method includes a service node (SN) receives a first service routing packet from a first service router (SR), where the first service routing packet comprises path identification information and identification information of a destination SN, the SN performing service processing on the first service routing packet to obtain a second service routing packet, where the second service routing packet includes the path identification information and identification information of a source SN, and where the value of the identification information of a source SN is the identification information of the destination SN comprised in the first service routing packet, and the SN sending the second service routing packet to the first SR.

17 Claims, 16 Drawing Sheets

Related U.S. Application Data continuation of application No. PCT/CN2014/079836, filed on Jun. 13, 2014.

(51) Int. Cl.
*H04L 12/701* (2013.01)
*H04L 12/715* (2013.01)
*H04L 29/06* (2006.01)

(58) Field of Classification Search
USPC .................. 370/255, 395.21, 395.3, 419, 468
See application file for complete search history.

(56) References Cited

U.S. PATENT DOCUMENTS

| | | |
|---|---|---|
| 9,300,570 B2 | 3/2016 | Hengeveld |
| 10,277,508 B2 * | 4/2019 | Niu .......................... H04L 45/00 |
| 2005/0198328 A1 | 9/2005 | Lee et al. |
| 2008/0250492 A1 * | 10/2008 | Hazard ............... H04L 63/0272 726/15 |
| 2010/0098072 A1 | 4/2010 | Satterlee et al. |
| 2010/0165985 A1 | 7/2010 | Sharma et al. |
| 2012/0027016 A1 | 2/2012 | Filsfils et al. |
| 2013/0094504 A1 | 4/2013 | Koteeswara et al. |
| 2013/0121137 A1 | 5/2013 | Feng et al. |
| 2013/0250951 A1 | 9/2013 | Koganti |
| 2013/0279508 A1 | 10/2013 | Kano |
| 2013/0322446 A1 * | 12/2013 | Biswas ............... H04L 12/4633 370/392 |
| 2013/0329605 A1 | 12/2013 | Nakil et al. |

FOREIGN PATENT DOCUMENTS

| | | |
|---|---|---|
| CN | 102136990 A | 7/2011 |
| CN | 102195855 A | 9/2011 |
| EP | 2479935 A1 | 7/2012 |
| EP | 2541848 A1 | 1/2013 |
| WO | 2012076065 A1 | 6/2012 |

* cited by examiner

| | Destination IP address | Source IP address | UDP header | Path ID | Source SN ID | Destination SN ID | Data packet |
|---|---|---|---|---|---|---|---|
| Packet 1 | 2.2.2.1 | 1.1.1.1 | UDP header | 55 | A | Invalid | Data packet |
| Packet 2 | 2.2.2.2 | 2.2.2.1 | UDP header | 55 | A | B | Data packet |
| Packet 3 | 2.2.2.1 | 2.2.2.2 | UDP header | 55 | B | Invalid | Data packet |
| Packet 4 | 3.3.3.1 | 22.2.1 | UDP header | 55 | B | D | Data packet |

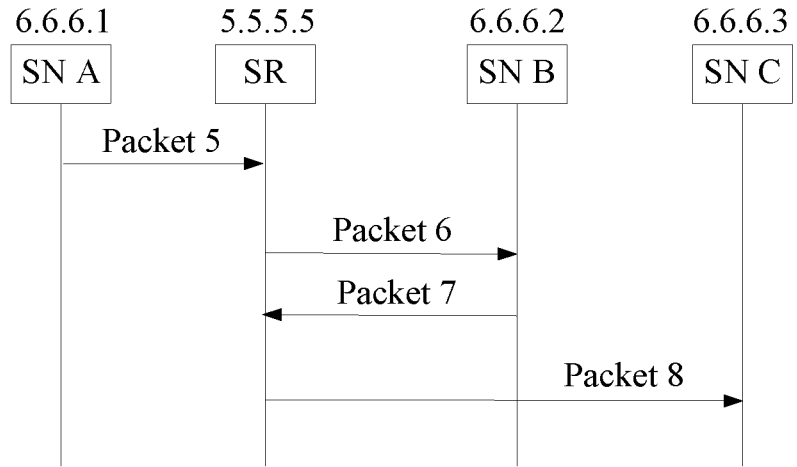
FIG. 9D
| | Destination IP address | Source IP address | Destination UDP port number | Source UDP port number | Data packet |
|---|---|---|---|---|---|
| Packet 1 | 5.5.5.5 | 6.6.6.1 | 1234 | 11 | Data packet |
| Packet 2 | 6.6.6.2 | 5.5.5.5 | 22 | 1234 | Data packet |
| Packet 3 | 5.5.5.5 | 6.6.6.2 | 1234 | 22 | Data packet |
| Packet 4 | 6.6.6.3 | 5.5.5.5 | 33 | 1234 | Data packet |
FIG. 9E
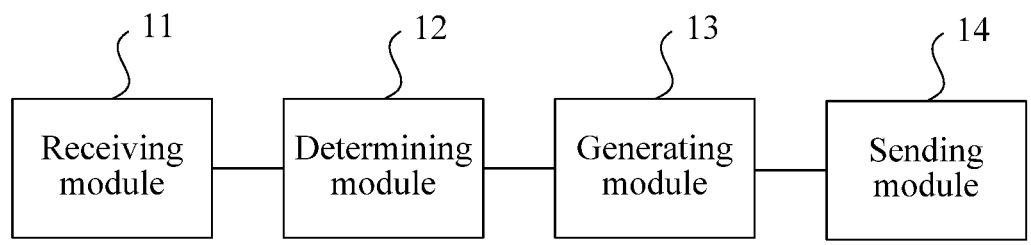
FIG. 10

SERVICE ROUTING PACKET PROCESSING METHOD AND APPARATUS, AND NETWORK SYSTEM

CROSS-REFERENCE TO RELATED APPLICATIONS

This application is a continuation of U.S. patent application No. U.S. Ser. No. 14/975,369, filed on Dec. 18, 2015, now U.S. Pat. No. 10,277,508. The U.S. patent application No. U.S. Ser. No. 14/975,369 is a continuation of International Application No. PCT/CN2014/079836, filed on Jun. 13, 2014, which claims priority to Chinese Patent Application No. 201310247638.0, filed on Jun. 20, 2013. All of the aforementioned patent applications are hereby incorporated by reference in their entireties.

TECHNICAL FIELD

Embodiments of the present application relate to communications technologies, and in particular, to a service routing packet processing method and apparatus, and a network system.

BACKGROUND

On a data center network or an Internet network, to support better service experience, it is necessary to deploy a service routing network on the data center network or Internet network. The service routing network includes one or more service routers (SRs) and one or more service nodes (SNs) that are attached to each SR.

In the prior art, an SN and an SR to which the SN is attached are implemented inside a same system, for example, the SN is a module inside an SR system, and communication between the SN and the SR is private implementation. However, when a case such as an SN implemented by using an independent server, a virtual machine (VM) on a server, or a proprietary hardware device, that is, a case of an independent SN, exists on the network, service routing cannot be implemented.

SUMMARY

Embodiments of the present application provide a service routing packet processing method and apparatus, and a network system, which are used to implement support of an independent SN for service routing.

According to a first aspect of the present application, a service routing packet processing method is provided, including: receiving, by a first service router SR, a first service routing packet; querying, by the first SR, a service routing table according to path identification information and identification information of a source service node SN that are carried in the first service routing packet, to determine identification information of a destination SN, where the service routing table includes a correspondence between the path identification information, the identification information of the source SN, and the identification information of the destination SN; generating, by the first SR, a second service routing packet according to the identification information of the destination SN and the first service routing packet; and sending, by the first SR, the second service routing packet.

In a first possible implementation manner of the first aspect, before the generating, by the first SR, a second service routing packet according to the identification information of the destination SN, the method further includes: determining, by the first SR according to the identification information of the destination SN, that an SR to which the destination SN is attached is the first SR and the destination SN is an independent SN.

With reference to the first aspect or the first possible implementation manner of the first aspect, in a second possible implementation manner of the first aspect, the path identification information is a value in a path identifier field in the first service routing packet, and the identification information of the source SN is a value in a source SN identifier field in the first service routing packet; the generating, by the first SR, a second service routing packet according to the identification information of the destination SN and the first service routing packet includes: setting, by the first SR, a value in a destination SN identifier field in the first service routing packet to an identifier of the destination SN, to obtain the second service routing packet; and the sending, by the first SR, the second service routing packet includes: querying, by the first SR, an underlay network header encapsulation table according to the identifier of the destination SN, to determine a first underlay network address corresponding to the identifier of the destination SN, where the first underlay network address is an address of a first underlay network, and the underlay network header encapsulation table includes a correspondence between the identifier of the destination SN and the first underlay network address; encapsulating, by the first SR, the second service routing packet, to obtain a first underlay network packet used to be transmitted on the first underlay network, where a destination address of the first underlay network packet is the first underlay network address; and sending, by the first SR, the first underlay network packet according to the destination address of the first underlay network packet.

With reference to the second possible implementation manner of the first aspect, in a third possible implementation manner of the first aspect, the first underlay network is an underlay network on which the destination SN is located.

With reference to the second or the third possible implementation manner of the first aspect, in a fourth possible implementation manner of the first aspect, the first underlay network is a network that runs the User Datagram Protocol UDP, the Internet, or the Ethernet.

With reference to the first aspect or any one of the first to the fourth possible implementation manners of the first aspect, in a fifth possible implementation manner of the first aspect, the receiving, by a first service router SR, a first service routing packet includes: receiving, by the first SR, a second underlay network packet in which the first service routing packet is encapsulated, where a packet type of the second underlay network packet is the same as a packet type of the first underlay network packet; and parsing, by the first SR, the second underlay network packet, to obtain the first service routing packet.

With reference to the first aspect or the first possible implementation manner of the first aspect, in a sixth possible implementation manner of the first aspect, the path identification information is a destination UDP port number, the identification information of the source SN is a source IP address, and the identification information of the destination SN is an IP address of the destination SN; and the generating, by the first SR, a second service routing packet according to the identification information of the destination SN and the first service routing packet includes: determining, by the first SR, a UDP port number of the destination SN, an IP address of the first SR, and a UDP port number of the first SR; and setting, by the first SR, a destination IP address of the first service routing packet to the IP address of the destination SN, setting a destination UDP port number of the first service routing packet to the UDP port number of the destination SN, setting a source IP address of the first service routing packet to the IP address of the first SR, and setting a source UDP port number of the first service routing packet to the UDP port number of the first SR, to generate the second service routing packet; or, the path identification information is a destination UDP port number, the identification information of the source SN is a source UDP port number, and the identification information of the destination SN is a UDP port number of the destination SN; and the generating, by the first SR, a second service routing packet according to the identification information of the destination SN and the first service routing packet includes: determining, by the first SR, an IP address of the destination SN, an IP address of the first SR, and a UDP port number of the first SR; and setting, by the first SR, a destination IP address of the first service routing packet to the IP address of the destination SN, setting a destination UDP port number of the first service routing packet to the UDP port number of the destination SN, setting a source IP address of the first service routing packet to the IP address of the first SR, and setting a source UDP port number of the first service routing packet to the UDP port number of the first SR, to generate the second service routing packet; or, the path identification information is a destination UDP port number, the identification information of the source SN is a source IP address and a source UDP port number, and the identification information of the destination SN is an IP address of the destination SN and a UDP port number of the destination SN; and the generating, by the first SR, a second service routing packet according to the identification information of the destination SN and the first service routing packet includes: determining, by the first SR, an IP address of the first SR and a UDP port number of the first SR; and setting, by the first SR, a destination IP address of the first service routing packet to the IP address of the destination SN, setting a destination UDP port number of the first service routing packet to the UDP port number of the destination SN, setting a source IP address of the first service routing packet to the IP address of the first SR, and setting a source UDP port number of the first service routing packet to the UDP port number of the first SR, to generate the second service routing packet.

With reference to the first aspect or the first or the sixth possible implementation manner of the first aspect, in a seventh possible implementation manner of the first aspect, the sending, by the first SR, the second service routing packet includes: sending, by the first SR, the second service routing packet according to a destination IP address of the second service routing packet.

According to a second aspect of the present application, a service routing packet processing method is provided, including: receiving, by a service node SN, a second service routing packet sent by a first service router SR; performing, by the SN, service processing on the second service routing packet, to obtain a third service routing packet; generating, by the SN, a fourth service routing packet according to the third service routing packet; and sending, by the SN, the fourth service routing packet to the first SR.

In a first possible implementation manner of the second aspect, the receiving, by a service node SN, a second service routing packet sent by a first service router SR includes: receiving, by the SN, a first underlay network packet that is sent by the first service router SR and in which the second service routing packet is encapsulated, where the first underlay network packet is a packet of a first underlay network; and parsing, by the SN, the first underlay network packet, to obtain the second service routing packet; the generating, by the SN, a fourth service routing packet according to the third service routing packet includes: setting, by the SN, a value in a source SN identifier field in the third service routing packet as an identifier of a destination SN, to obtain the fourth service routing packet; and the sending, by the SN, the fourth service routing packet to the first SR includes: setting, by the SN, a value in a source address field in the first underlay network packet as a destination address, and setting a destination address field in the first underlay network packet as a source address, to obtain a third underlay network packet, where the fourth service routing packet is encapsulated in the third underlay network packet, and a packet type of the third underlay network packet is the same as a packet type of the first underlay network packet; and sending, by the SN, the third underlay network packet to the first SR.

With reference to the second aspect or the first possible implementation manner of the second aspect, in a second possible implementation manner of the second aspect, the first underlay network is a network that runs the User Datagram Protocol UDP, the Internet, or the Ethernet.

According to the second aspect, in a third possible implementation manner of the second aspect, the generating, by the SN, a fourth service routing packet according to the third service routing packet includes: setting, by the SN, a source IP address in the third service routing packet as a destination IP address, setting a destination IP address in the third service routing packet as a source IP address, setting a source UDP port number in the third service routing packet as a destination UDP port number, and setting a destination UDP port number in the third service routing packet as a source UDP port number, to generate the fourth service routing packet.

According to a third aspect of the present application, a service router is provided, including: a receiving module, configured to receive a first service routing packet; a determining module, configured to query a service routing table according to path identification information and identification information of a source service node SN that are carried in the first service routing packet, to determine identification information of a destination SN, where the service routing table includes a correspondence between the path identification information, the identification information of the source SN, and the identification information of the destination SN; a generating module, configured to generate a second service routing packet according to the identification information of the destination SN and the first service routing packet; and a sending module, configured to send the second service routing packet.

In a first possible implementation manner of the third aspect, the determining module is further configured to: before the second service routing packet is generated according to the identification information of the destination SN, determine, according to the identification information of the destination SN, that an SR to which the destination SN is attached is the first SR and the destination SN is an independent SN.

With reference to the third aspect or the first possible implementation manner of the third aspect, in a second possible implementation manner of the third aspect, the path identification information is a value in a path identifier field in the first service routing packet, and the identification information of the source SN is a value in a source SN identifier field in the first service routing packet; the generating module is specifically configured to: set a value in a destination SN identifier field in the first service routing packet to an identifier of the destination SN, to obtain the second service routing packet; and the sending module is specifically configured to: query an underlay network header encapsulation table according to the identifier of the destination SN, to determine a first underlay network address corresponding to the identifier of the destination SN, where the first underlay network address is an address of a first underlay network, and the underlay network header encapsulation table includes a correspondence between the identifier of the destination SN and the first underlay network address; encapsulate the second service routing packet, to obtain a first underlay network packet used to be transmitted on the first underlay network, where a destination address of the first underlay network packet is the first underlay network address; and send the first underlay network packet according to the destination address of the first underlay network packet.

With reference to the second possible implementation manner of the third aspect, in a third possible implementation manner of the third aspect, the first underlay network is an underlay network on which the destination SN is located.

With reference to the third aspect or any one of the first to the third possible implementation manners of the third aspect, in a fourth possible implementation manner of the third aspect, the first underlay network is a network that runs the User Datagram Protocol UDP, the Internet, or the Ethernet.

With reference to the third aspect or any one of the first to the fourth possible implementation manners of the third aspect, in a fifth possible implementation manner of the third aspect, the receiving module is specifically configured to: receive a second underlay network packet in which the first service routing packet is encapsulated, where a packet type of the second underlay network packet is the same as a packet type of the first underlay network packet; and parse the second underlay network packet, to obtain the first service routing packet.

With reference to the third aspect or the first possible implementation manner of the third aspect, in a sixth possible implementation manner of the third aspect, the path identification information is a destination UDP port number, the identification information of the source SN is a source IP address, and the identification information of the destination SN is an IP address of the destination SN; and the generating module is further configured to: determine a UDP port number of the destination SN, an IP address of the first SR, and a UDP port number of the first SR; and set a destination IP address of the first service routing packet to the IP address of the destination SN, set a destination UDP port number of the first service routing packet to the UDP port number of the destination SN, set a source IP address of the first service routing packet to the IP address of the first SR, and set a source UDP port number of the first service routing packet to the UDP port number of the first SR, to generate the second service routing packet; or, the path identification information is a destination UDP port number, the identification information of the source SN is a source UDP port number, and the identification information of the destination SN is a UDP port number of the destination SN; and the generating module is further configured to: determine an IP address of the destination SN, an IP address of the first SR, and a UDP port number of the first SR; and set a destination IP address of the first service routing packet to the IP address of the destination SN, set a destination UDP port number of the first service routing packet to the UDP port number of the destination SN, set a source IP address of the first service routing packet to the IP address of the first SR, and set a source UDP port number of the first service routing packet to the UDP port number of the first SR, to generate the second service routing packet; or, the path identification information is a destination UDP port number, the identification information of the source SN is a source IP address and a source UDP port number, and the identification information of the destination SN is an IP address of the destination SN and a UDP port number of the destination SN; and the generating module is further configured to: determine an IP address of the first SR and a UDP port number of the first SR; and set a destination IP address of the first service routing packet to the IP address of the destination SN, set a destination UDP port number of the first service routing packet to the UDP port number of the destination SN, set a source IP address of the first service routing packet to the IP address of the first SR, and set a source UDP port number of the first service routing packet to the UDP port number of the first SR, to generate the second service routing packet.

With reference to the third aspect or the first or the sixth possible implementation manner of the third aspect, in a seventh possible implementation manner of the third aspect, the sending module is further configured to: send the second service routing packet according to a destination IP address of the second service routing packet.

According to a fourth aspect of the present application, a service node is provided, including: a receiving module, configured to receive a second service routing packet sent by a first service router SR; a processing module, configured to perform service processing on the second service routing packet, to obtain a third service routing packet; a generating module, configured to generate a fourth service routing packet according to the third service routing packet; and a sending module, configured to send the fourth service routing packet to the first SR.

In a first possible implementation manner of the fourth aspect, the receiving module is specifically configured to: receive a first underlay network packet that is sent by the first service router SR and in which the second service routing packet is encapsulated, where the first underlay network packet is a packet of a first underlay network; and parse the first underlay network packet, to obtain the second service routing packet; the generating module is specifically configured to: set a value in a source SN identifier field in the third service routing packet as an identifier of a destination SN, to obtain the fourth service routing packet; and the sending module is specifically configured to: set a value in a source address field in the first underlay network packet as a destination address, and set a destination address field in the first underlay network packet as a source address, to obtain a third underlay network packet, where the fourth service routing packet is encapsulated in the third underlay network packet, and a packet type of the third underlay network packet is the same as a packet type of the first underlay network packet; and send the third underlay network packet to the first SR.

With reference to the fourth aspect or the first possible implementation manner of the fourth aspect, in a second possible implementation manner of the fourth aspect, the first underlay network is a network that runs the User Datagram Protocol UDP, the Internet, or the Ethernet.

According to the fourth aspect, in a third possible implementation manner of the fourth aspect, the generating module is specifically configured to: set a source IP address in the third service routing packet as a destination IP address, set a destination IP address in the third service routing packet as a source IP address, set a source UDP port number in the third service routing packet as a destination UDP port number, and set a destination UDP port number in the third service routing packet as a source UDP port number, to generate the fourth service routing packet.

According to a fifth aspect, a network system is provided, including: the service router according to the third aspect or any possible implementation manner of the third aspect, and the service node according to the fourth aspect or any possible implementation manner of the fourth aspect.

In the service routing packet processing method provided by this embodiment, a first SR receives a first service routing packet, queries a service routing table according to path identification information and identification information of a source SN that are carried in the first service routing packet, to determine identification information of a destination SN, determines, according to the identification information of the destination SN, that an SR to which the destination SN is attached is the first SR and the destination SN is an independent SN, then generates a second service routing packet according to the identification information of the destination SN and the first service routing packet, and sends the second service routing packet, thereby implementing forwarding of a service routing packet between an SR and an independent SN, and further implementing support of an independent SN for service routing.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show some embodiments of the present application, and a person of ordinary skill in the art may still derive other drawings from these accompanying drawings without creative efforts.

FIG. 9D is a schematic diagram of sending and receiving of service routing packets between an SR and SNs in Embodiment 8 of the service routing packet processing method according to the present application;

FIG. 9E is a schematic diagram of key information of packets in FIG. 9D;

FIG. 10 is a schematic structural diagram of Embodiment 1 of a service routing packet processing apparatus according to the present application;

DETAILED DESCRIPTION OF ILLUSTRATIVE EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Figure 1A:
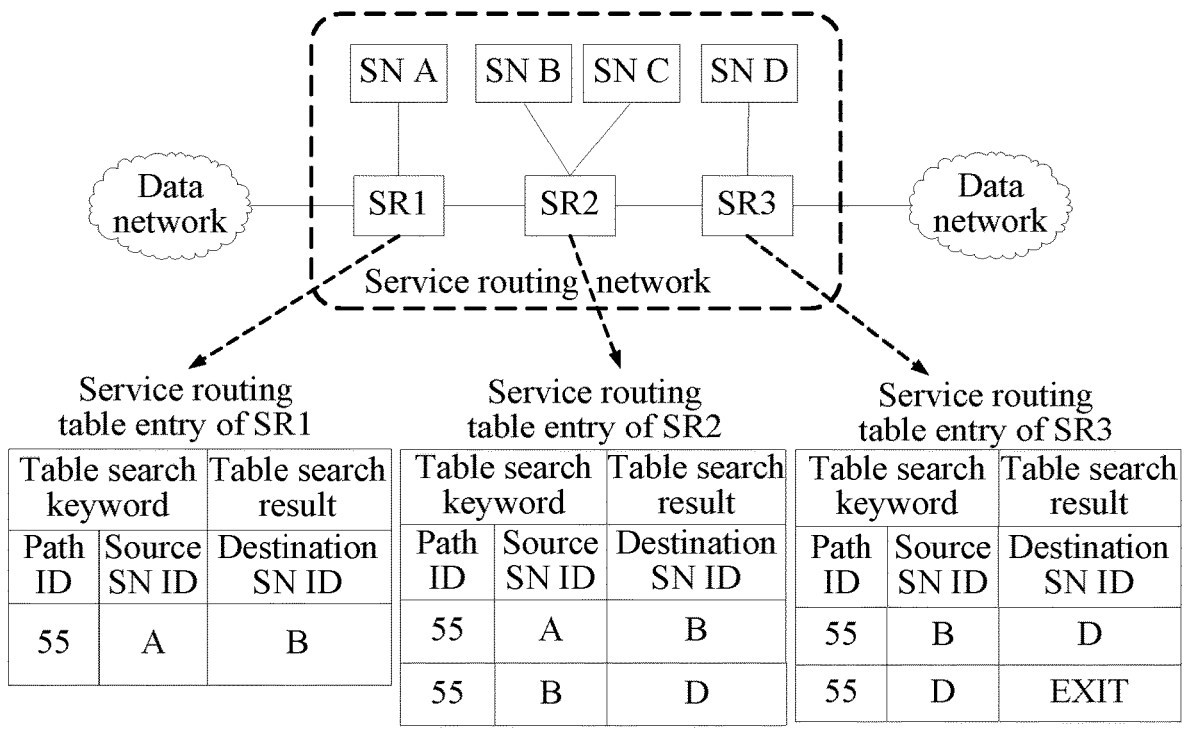
FIG. 1A is a schematic diagram of a service routing principle.

FIG. 1A is a schematic diagram of a service routing principle. As shown in FIG. 1A, a service routing network is formed by one or more SRs and one or more SNs that are attached to each SR. In FIG. 1A, an SN A is attached to an SR1, an SN B and an SN C are attached to an SR2, and an SN D is attached to an SR3.

An SN is responsible for service enhancement processing, for example, providing a load balancing function, a network address translation (NAT) function, a network firewall function, a uniform resource locator (URL) filtration function, and the like.

A combination of multiple SNs and a sequence in which these SNs process packets is referred to as a service, and the service is identified by using one or more path (path) IDs, where a consistent path ID may be used on an entire service path, or different segments of a service path may be identified by using different path IDs, for example: supporting a data packet to sequentially pass through SN A→SN B→SN C is a service, where a path ID of the entire path is 34; supporting a data packet to sequentially pass through SN A→SN C→SN B is another service, where a path ID of SN A→SN C is 23, and a path ID of SN C→SN B is 34; and supporting a data packet to sequentially pass through SN C→SN D is another service, where a path ID is 45.

A technology of forcing a data packet to pass through one or more SNs is referred to as service routing, and this function is implemented on an SR.

The SR is responsible for adding, according to a service feature (for example, a quintuple in a packet header: a source IP address, a destination IP address, a protocol type, a source Transmission Control Protocol (TCP)/User Datagram Protocol (UDP) port number, and a destination TCP/UDP port number), a service header to a data packet that enters the service routing network; after the data packet enters the service routing network, the SR is responsible for forwarding a data stream on the entire service routing network in a service routing manner, peels a service header off a packet output by a last SN, and sends the packet out of the service routing network.

Figure 1B:
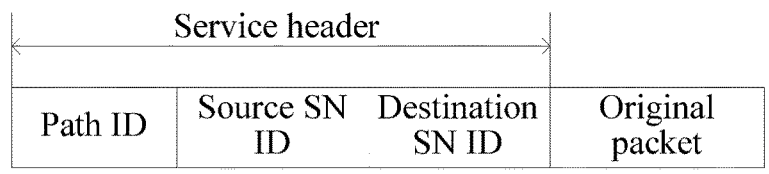
FIG. 1B is a schematic diagram of a packet format in a service routing implementation manner.

FIG. 1B is a schematic diagram of a packet format of a service routing implementation manner. As shown in FIG. 1B, definitions of fields in a service header include:

path ID: an identifier of a service routing path, where different services have different service paths;

destination SN ID: an ID of a next SN of the service routing packet; and source SN ID: an ID of a previous SN of the service routing packet.

As shown in FIG. 1A, in the prior art, to implement service routing of SN A→SN B→SN D, a processing method on the SR2 is as follows: the SR2 receives, from the SR1, a packet that is processed by the SN A and carries a service header, searches, according to a path ID (55) field and a source SN ID (A) field in the service header, service routing table entries of the SR2 shown in FIG. 1A, to obtain that an ID of a destination SN is SN(B), and determines that an SR to which the destination SN is attached is the SR2, and the SR2 sends the packet to the SN B for processing; and for the packet that has been processed by the SN B, the SR2 searches, according to a path ID (55) field and a source SN ID (B) field in a service header, the service routing table entries of the SR2 shown in FIG. 1A, to obtain an ID (D) of a destination SN, and determines that an SR to which the destination SN is attached is not the SR2, and the processed packet needs to be sent to the SR3 to which the destination SN D is attached, to be further processed by the SR3. A packet processing manner of the SR3 is the same as the mechanism of the SR2, and after processing of the last SN D is completed, the SR3 peels off the service header, and sends the data packet out of the service routing network.

Figure 2:
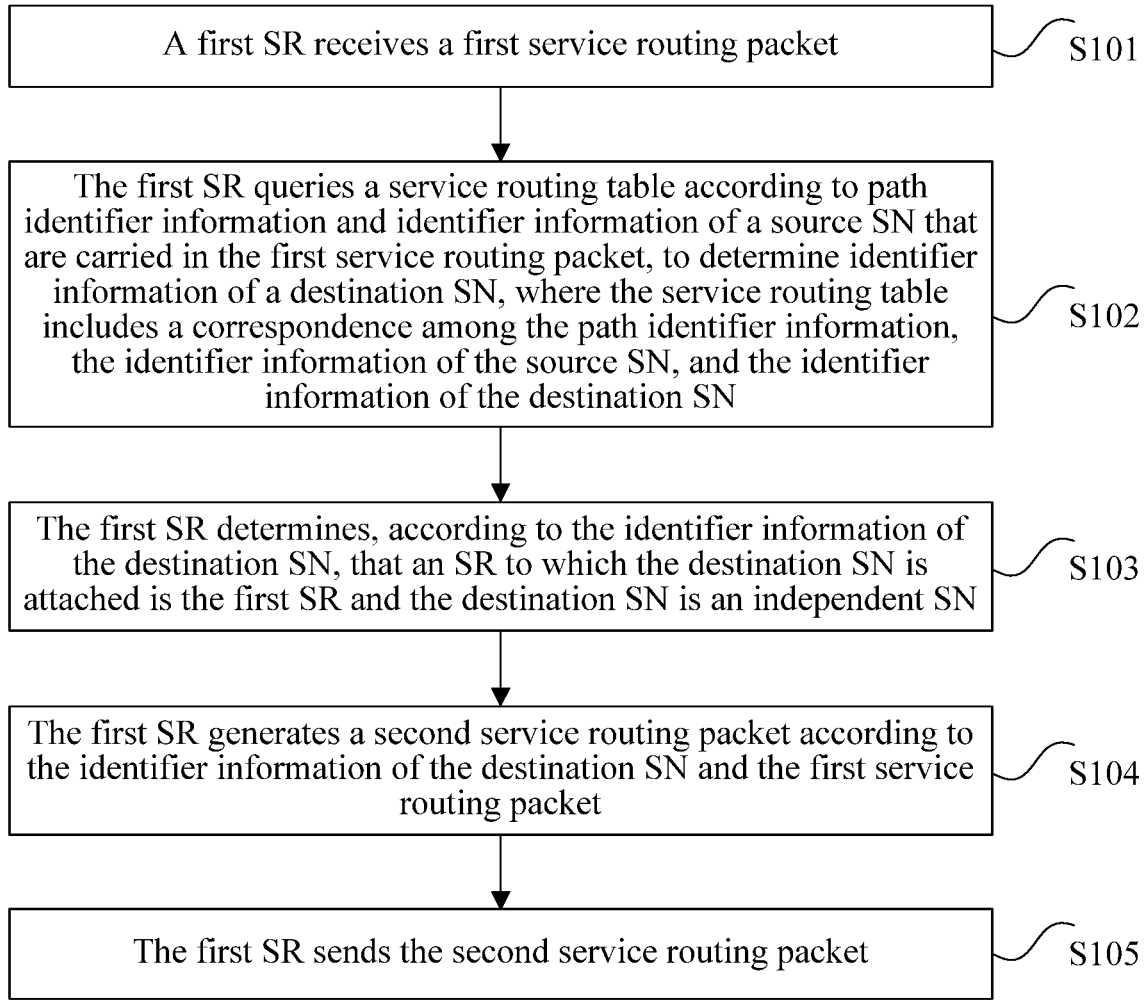
FIG. 2 is a flowchart of Embodiment 1 of a service routing packet processing method according to the present application.

FIG. 2 is a flowchart of Embodiment 1 of a service routing packet processing method according to the present application. As shown in FIG. 2, the service routing packet processing method in this embodiment may include the following steps.

S101: A first SR receives a first service routing packet.

S102: The first SR queries a service routing table according to path identification information and identification information of a source SN that are carried in the first service routing packet, to determine identification information of a destination SN, where the service routing table includes a correspondence between the path identification information, the identification information of the source SN, and the identification information of the destination SN.

S103: The first SR determines, according to the identification information of the destination SN, that an SR to which the destination SN is attached is the first SR and the destination SN is an independent SN.

S104: The first SR generates a second service routing packet according to the identification information of the destination SN and the first service routing packet.

S105: The first SR sends the second service routing packet.

Specifically, a scenario to which the technical solution of the present application is applicable is support of an SR and an independent SN for service routing.

In the service routing packet processing method provided by this embodiment, a first SR receives a first service routing packet, queries a service routing table according to path identification information and identification information of a source SN that are carried in the first service routing packet, to determine identification information of a destination SN, determines, according to the identification information of the destination SN, that an SR to which the destination SN is attached is the first SR and the destination SN is an independent SN, generates a second service routing packet according to the identification information of the destination SN and the first service routing packet, and sends the second service routing packet, thereby implementing forwarding of a service routing packet between an SR and an independent SN, and further implementing support of an independent SN for service routing.

Figure 3:
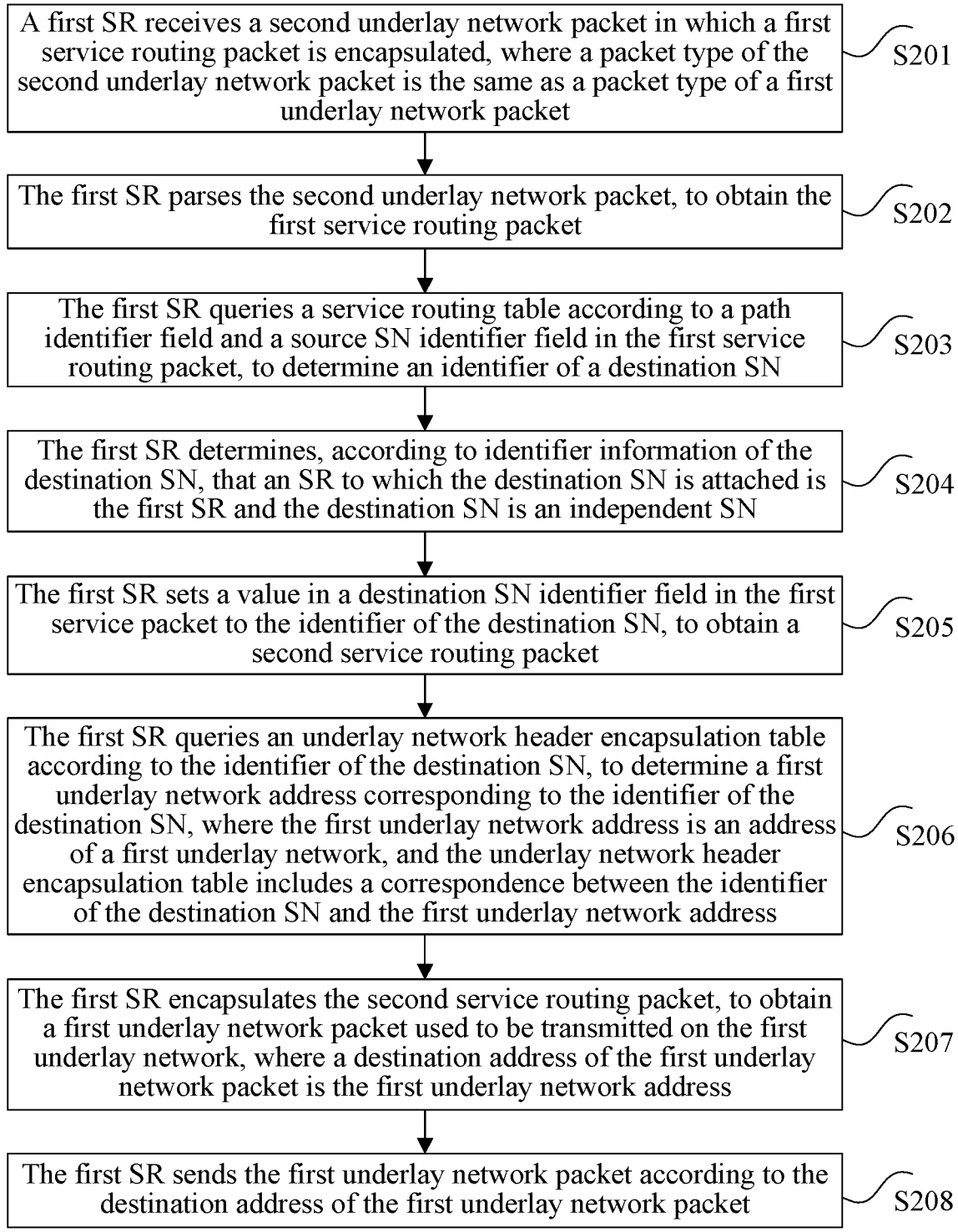
FIG. 3 is a flowchart of Embodiment 2 of a service routing packet processing method according to the present application.

FIG. 3 is a flowchart of Embodiment 2 of a service routing packet processing method according to the present application. As shown in FIG. 3, in the service routing packet processing method in this embodiment, on the basis of the embodiment shown in FIG. 2, an SR implements sending and receiving of service routing packets by using an underlay network, where path identification information is a value in a path identifier field in a first service routing packet, and identification information of a source SN is a value in a source SN identifier field in the first service routing packet, and the method may include the following steps.

S201: A first SR receives a second underlay network packet in which a first service routing packet is encapsulated, where a packet type of the second underlay network packet is the same as a packet type of a first underlay network packet.

S202: The first SR parses the second underlay network packet, to obtain the first service routing packet.

S203: The first SR queries a service routing table according to a path identifier field and a source SN identifier field in the first service routing packet, to determine an identifier of a destination SN.

Specifically, S203 in this embodiment is a possible implementation manner of S102 in the embodiment shown in FIG. 2, and because in this embodiment, the path identification information is the value in the path identifier field in the first service routing packet, and the identification information of the source SN is the value in the source SN identifier field in the first service routing packet, S203 may be obtained.

S204: The first SR determines, according to identification information of the destination SN, that an SR to which the destination SN is attached is the first SR and the destination SN is an independent SN.

S205: The first SR sets a value in a destination SN identifier field in the first service packet to the identifier of the destination SN, to obtain a second service routing packet.

S206: The first SR queries an underlay network header encapsulation table according to the identifier of the destination SN, to determine a first underlay network address corresponding to the identifier of the destination SN, where the first underlay network address is an address of a first underlay network, and the underlay network header encapsulation table includes a correspondence between the identifier of the destination SN and the first underlay network address.

S207: The first SR encapsulates the second service routing packet, to obtain a first underlay network packet used to be transmitted on the first underlay network, where a destination address of the first underlay network packet is the first underlay network address.

S208: The first SR sends the first underlay network packet according to the destination address of the first underlay network packet.

Optionally, the first underlay network is an underlay network on which the destination SN is located.

Optionally, the first underlay network is a network that runs the UDP, the Internet, or the Ethernet.

It should be noted that the underlay network is not limited to being implemented in a UDP manner, and implementation of the underlay network by using an IP network, the Ethernet, a multi-protocol label switching (MPLS) network, and various tunnel technologies may be supported.

If the underlay network in this embodiment is the Internet, content of the underlay network header encapsulation table is IP addresses of SNs;

if the underlay network in this embodiment is the Ethernet, content of the underlay network header encapsulation table is MAC addresses of SNs; or if the underlay network in this embodiment is an MPLS network, content of the underlay network header encapsulation table is MPLS labels of SNs.

It should be noted that, if the underlay network in this embodiment is the network on which the UDP runs, the first underlay network packet and the second underlay network packet in this embodiment are both UDP packets;

if the underlay network in this embodiment is the Internet, the first underlay network packet and the second underlay network packet in this embodiment are both IP packets; or if the underlay network in this embodiment is the Ethernet, the first underlay network packet and the second underlay network packet in this embodiment are both Ethernet packets.

In the service routing packet processing method provided in this embodiment, a first SR receives a second underlay network packet by using an underlay network, and parses the second underlay network packet to obtain a first service routing packet; queries a service routing table according to a path identifier field and a source SN identifier field in the first service routing packet, to determine an identifier of a destination SN; sets a value in a destination SN identifier field in the first service packet to the identifier of the destination SN, to obtain a second service routing packet; and then encapsulates the second service routing packet, and sends the first underlay network packet according to a destination address of the first underlay network packet, thereby implementing forwarding of a service routing packet between an SR and an independent SN, and further implementing support of an independent SN for service routing.

Figure 4:
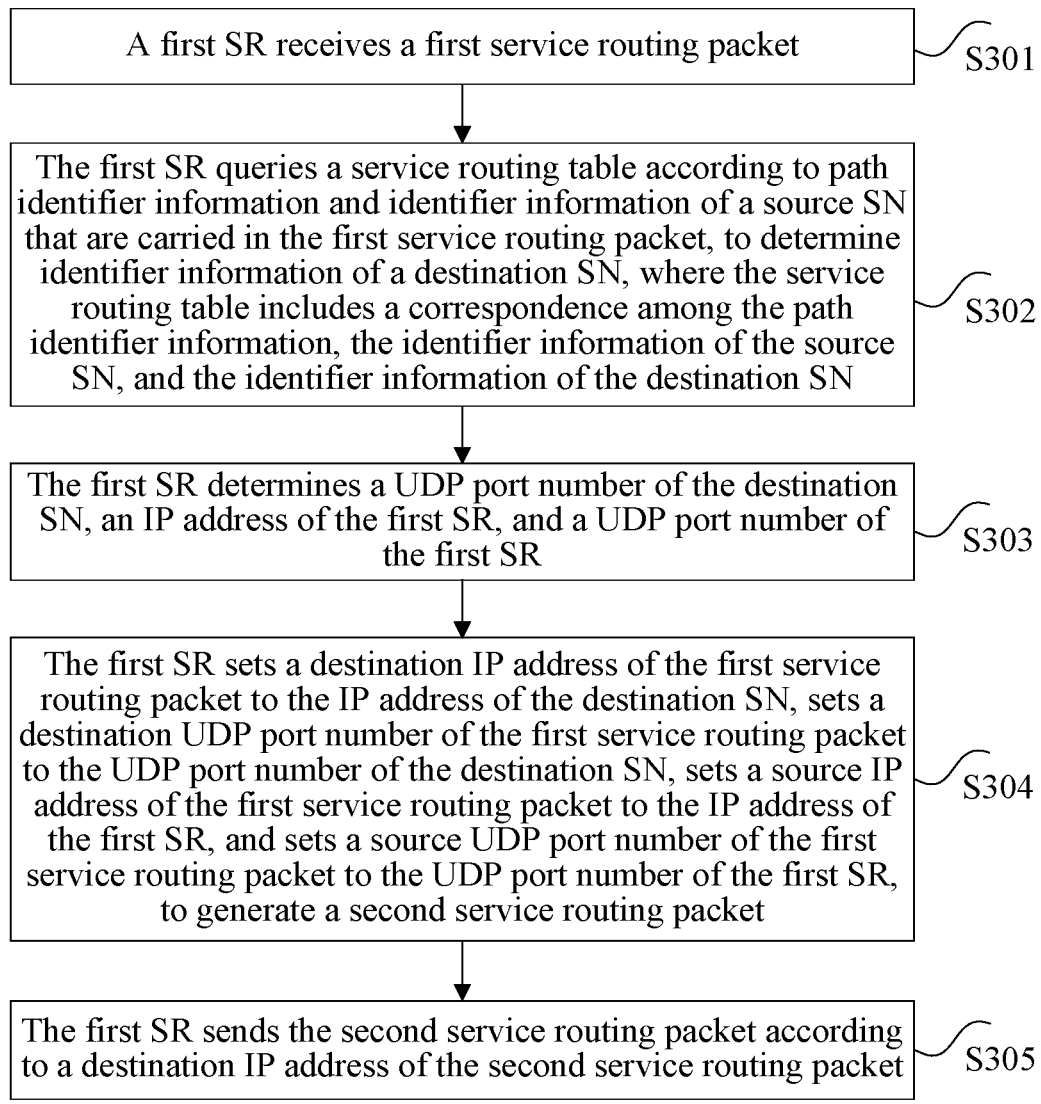
FIG. 4 is a flowchart of Embodiment 3 of a service routing packet processing method according to the present application.

FIG. 4 is a flowchart of Embodiment 3 of a service routing packet processing method according to the present application. As shown in FIG. 4, in the service routing packet processing method in this embodiment, on the basis of the embodiment shown in FIG. 2, an SR implements sending and receiving of service routing packets by encapsulating an IP header and a UDP header outside an original data packet, and the method may include the following steps.

S301: A first SR receives a first service routing packet.

S302: The first SR queries a service routing table according to path identification information and identification information of a source SN that are carried in the first service routing packet, to determine identification information of a destination SN, where the service routing table includes a correspondence between the path identification information, the identification information of the source SN, and the identification information of the destination SN.

In this embodiment, in S302, the path identification information, the identification information of the source SN, and the identification information of the destination SN are mapped to IP header information and UDP header information, and the mapping may include three specific mapping manners:

Mapping manner 1: the path identification information is a destination UDP port number, the identification information of the source SN is a source IP address, and the identification information of the destination SN is an IP address of the destination SN.

For the mapping manner 1, after S302, the method includes:

S303: The first SR determines a UDP port number of the destination SN, an IP address of the first SR, and a UDP port number of the first SR.

S304: The first SR sets a destination IP address of the first service routing packet to the IP address of the destination SN, sets a destination UDP port number of the first service routing packet to the UDP port number of the destination SN, sets a source IP address of the first service routing packet to the IP address of the first SR, and sets a source UDP port number of the first service routing packet to the UDP port number of the first SR, to generate a second service routing packet.

S305: The first SR sends the second service routing packet according to a destination IP address of the second service routing packet.

Mapping manner 2: the path identification information is a destination UDP port number, the identification information of the source SN is a source UDP port number, and the identification information of the destination SN is a UDP port number of the destination SN.

For the mapping manner 2, S303 and S304 may be:

the first SR determines an IP address of the destination SN, an IP address of the first SR, and a UDP port number of the first SR; and the first SR sets a destination IP address of the first service routing packet to the IP address of the destination SN, sets a destination UDP port number of the first service routing packet to the UDP port number of the destination SN, sets a source IP address of the first service routing packet to the IP address of the first SR, and sets a source UDP port number of the first service routing packet to the UDP port number of the first SR, to generate a second service routing packet.

Mapping manner 3: the path identification information is a destination UDP port number, the identification information of the source SN is a source IP address and a source UDP port number, and the identification information of the destination SN is an IP address of the destination SN and a UDP port number of the destination SN.

For the mapping manner 3, S303 and S304 may be:
the first SR determines an IP address of the first SR and a UDP port number of the first SR; and
the first SR sets a destination IP address of the first service routing packet to the IP address of the destination SN, sets a destination UDP port number of the first service routing packet to the UDP port number of the destination SN, sets a source IP address of the first service routing packet to the IP address of the first SR, and sets a source UDP port number of the first service routing packet to the UDP port number of the first SR, to generate a second service routing packet.

It should be noted that a format of the second service routing packet in this embodiment is different from that of the second service routing packet in the embodiment shown in FIG. 3.

In the service routing packet processing method provided in this embodiment, an SR implements sending and receiving of service routing packets by encapsulating an IP header and a UDP header outside an original data packet, thereby implementing forwarding of a service routing packet between an SR and an independent SN, and further implementing support of an independent SN for service routing.

Figure 5:
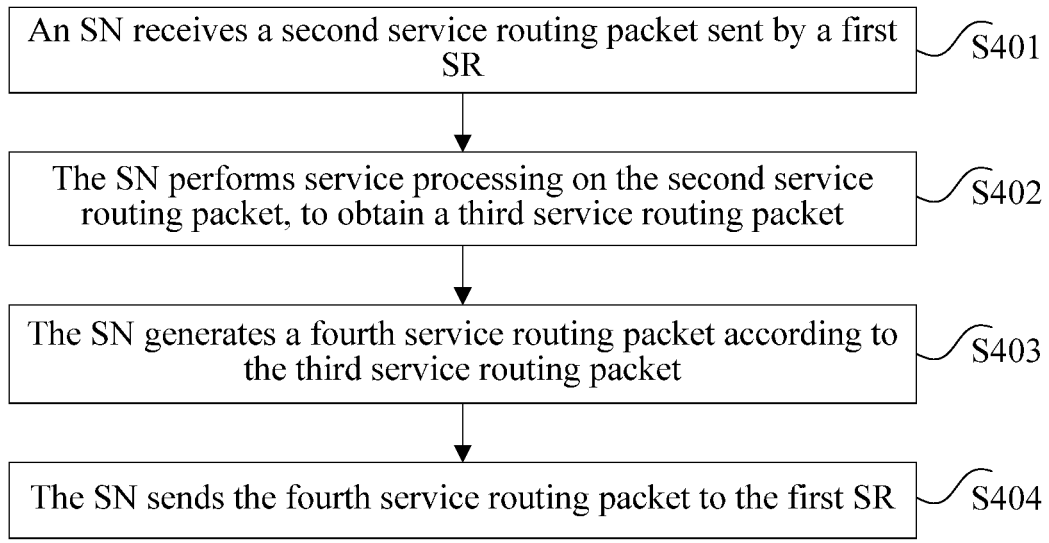
FIG. 5 is a flowchart of Embodiment 4 of a service routing packet processing method according to the present application.

FIG. 5 is a flowchart of Embodiment 4 of a service routing packet processing method according to the present application. As shown in FIG. 5, the service routing packet processing method in this embodiment includes the following steps.

S401: An SN receives a second service routing packet sent by a first SR.

S402: The SN performs service processing on the second service routing packet, to obtain a third service routing packet.

Specifically, that the SN performs service processing on the second service routing packet may include that the SN performs service enhancement processing such as load balancing, NAT, network firewall, and URL filtration.

S403: The SN generates a fourth service routing packet according to the third service routing packet.

S404: The SN sends the fourth service routing packet to the first SR.

Specifically, an SR to which the SN is attached in this embodiment is the first SR, and the SN is an independent SN.

In the service routing packet processing method provided in this embodiment, an SN receives a second service routing packet sent by a first SR, performs service processing on the second service routing packet, to obtain a third service routing packet, then generates a fourth service routing packet according to the third service routing packet, and sends the fourth service routing packet to the first SR, thereby implementing forwarding of a service routing packet between an SR and an independent SN, and further implementing support of an independent SN for service routing.

Figure 6:
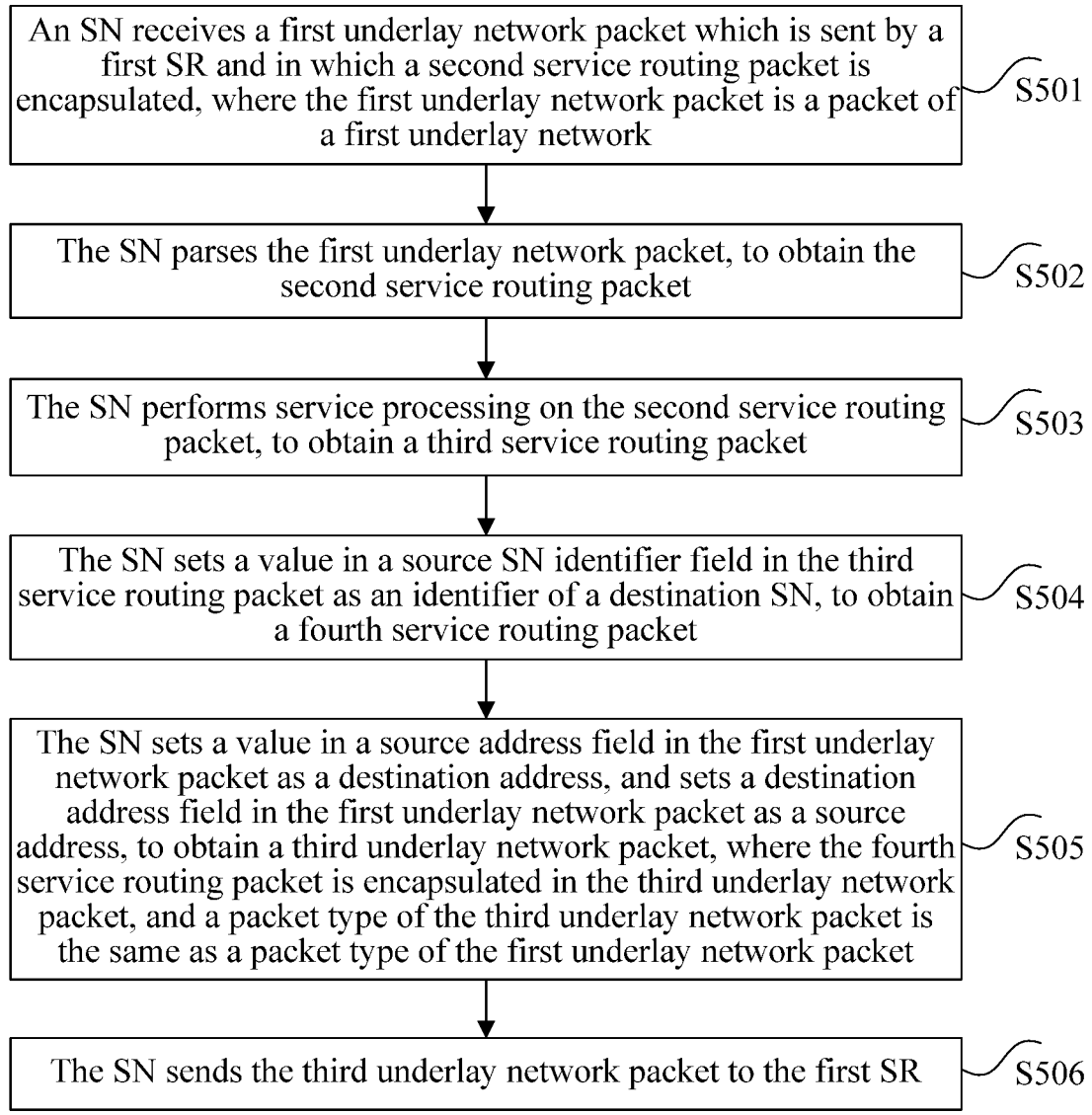
FIG. 6 is a flowchart of Embodiment 5 of a service routing packet processing method according to the present application.

FIG. 6 is a flowchart of Embodiment 5 of a service routing packet processing method according to the present application. As shown in FIG. 6, in the service routing packet processing method in this embodiment, on the basis of the embodiment shown in FIG. 5, an SR implements sending and receiving of service routing packets by using an underlay network, and the method includes the following steps.

S501: An SN receives a first underlay network packet that is sent by a first SR and in which a second service routing packet is encapsulated, where the first underlay network packet is a packet of a first underlay network.

S502: The SN parses the first underlay network packet, to obtain the second service routing packet.

S503: The SN performs service processing on the second service routing packet, to obtain a third service routing packet.

S504: The SN sets a value in a source SN identifier field in the third service routing packet as an identifier of a destination SN, to obtain a fourth service routing packet.

S505: The SN sets a value in a source address field in the first underlay network packet as a destination address, and sets a destination address field in the first underlay network packet as a source address, to obtain a third underlay network packet, where the fourth service routing packet is encapsulated in the third underlay network packet, and a packet type of the third underlay network packet is the same as a packet type of the first underlay network packet.

S506: The SN sends the third underlay network packet to the first SR.

Optionally, the first underlay network is a network that runs the UDP, the Internet, or the Ethernet.

In this embodiment, for the description about the underlay network, reference may be made to the description in the embodiment shown in FIG. 3, and details are not provided again herein.

In the service routing packet processing method provided in this embodiment, an SN receives a first underlay network packet that is sent by a first SR and in which a second service routing packet is encapsulated; parses the first underlay network packet, to obtain the second service routing packet; performs service processing on the second service routing packet, to obtain a third service routing packet; then sets a value in a source SN identifier field in the third service routing packet as an identifier of a destination SN, to obtain a fourth service routing packet; then sets a value in a source address field in the first underlay network packet as a destination address, and sets a value in a destination address field in the first underlay network packet as a source address, to obtain a third underlay network packet; and sends the third underlay network packet to the first SR, thereby implementing forwarding of a service routing packet between an SR and an independent SN, and further implementing support of an independent SN for service routing.

Figure 7:
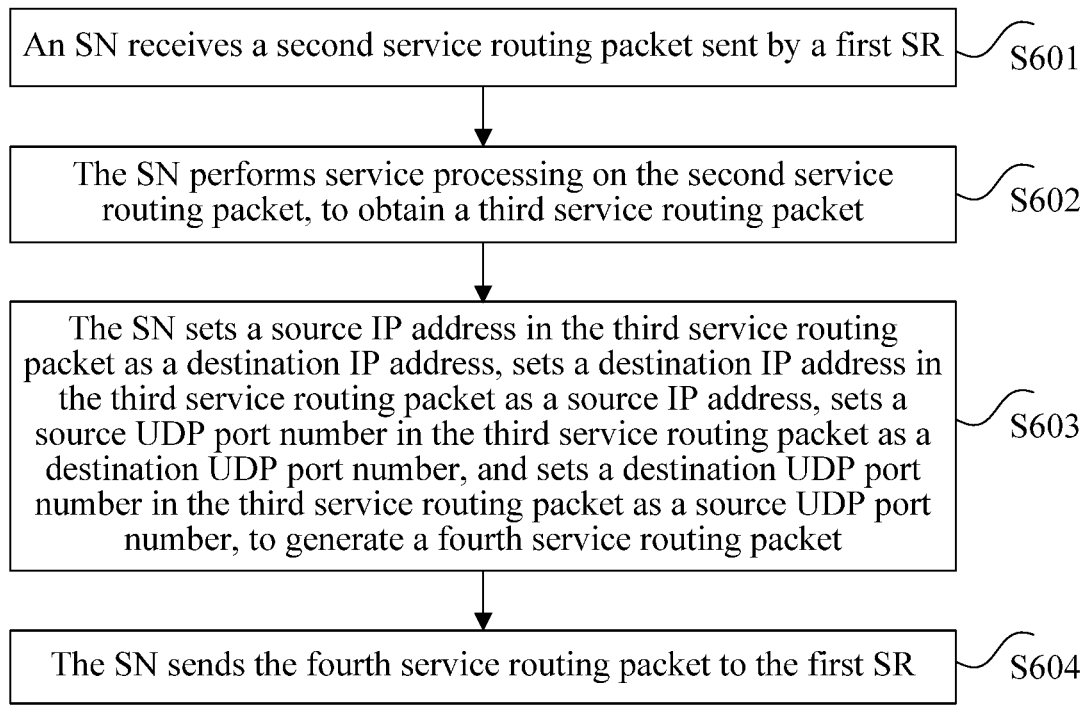
FIG. 7 is a flowchart of Embodiment 6 of a service routing packet processing method according to the present application.

FIG. 7 is a flowchart of Embodiment 6 of a service routing packet processing method according to the present application. As shown in FIG. 7, in the service routing packet processing method in this embodiment, on the basis of the embodiment shown in FIG. 5, an SR implements sending and receiving of service routing packets by encapsulating an IP header and a UDP header outside an original data packet, and the method includes the following steps.

S601: An SN receives a second service routing packet sent by a first SR.

S602: The SN performs service processing on the second service routing packet, to obtain a third service routing packet.

S603: The SN sets a source IP address in the third service routing packet as a destination IP address, sets a destination IP address in the third service routing packet as a source IP address, sets a source UDP port number in the third service routing packet as a destination UDP port number, and sets a destination UDP port number in the third service routing packet as a source UDP port number, to generate a fourth service routing packet.

S604: The SN sends the fourth service routing packet to the first SR.

It should be noted that a format of the fourth service routing packet in this embodiment is different from that of the fourth service routing packet in the embodiment shown in FIG. 6.

In the service routing packet processing method provided in this embodiment, an SN receives a second service routing packet sent by a first SR; performs service processing on the second service routing packet, to obtain a third service routing packet; sets a source IP address in the third service routing packet as a destination IP address, sets a destination IP address in the third service routing packet as a source IP address, sets a source UDP port number in the third service routing packet as a destination UDP port number, and sets a destination UDP port number in the third service routing packet as a source UDP port number, to generate a fourth service routing packet; and sends the fourth service routing packet to the first SR, thereby implementing forwarding of a service routing packet between an SR and an independent SN may be implemented, and further implementing support of an independent SN for service routing.

The following describes a service routing packet processing method in the present application in detail based on sending and receiving processes of service routing packets between a first SR and SNs.

Figure 8A:
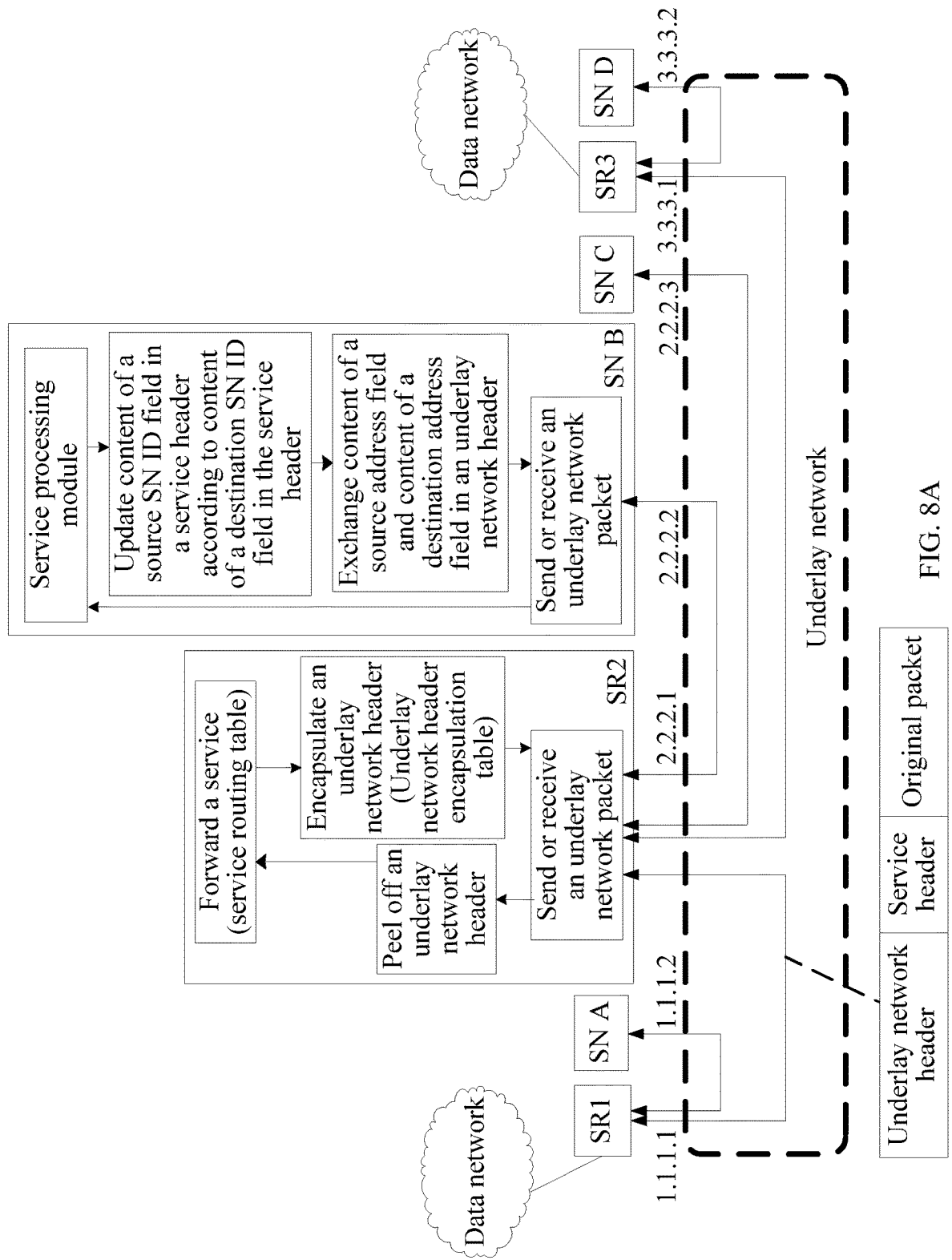
FIG. 8A is a schematic diagram of a principle for implementing a service routing forwarding mechanism of Embodiment 7 of a service routing packet processing method according to the present application.

FIG. 8A is a schematic diagram of a principle for implementing a service routing forwarding mechanism of Embodiment 7 of a service routing packet processing method according to the present application. As shown in FIG. 8A, an SN A, an SN B, an SN C, and an SN D are all independent SNs, where the SN A is attached to an SR1, the SN B and the SN C are attached to an SR2, and the SN D is attached to an SR3. For communication between an SN and an SR and communication between SRs, an underlay (underlay) network header needs to be encapsulated in front of a service header of a service routing packet, to implement communication over an underlay network.

Figure 8B:
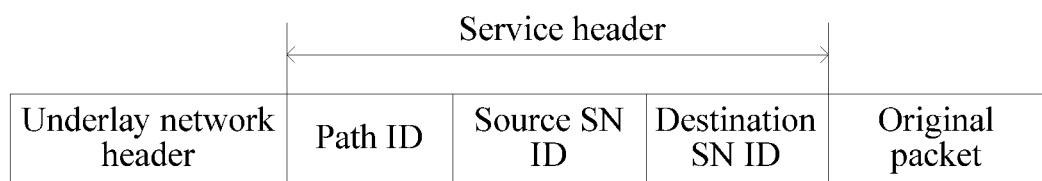
FIG. 8B is a format of a service routing packet in which an underlay network header is encapsulated.

FIG. 8B is a format of a service routing packet in which an underlay network header is encapsulated. As shown in FIG. 8B, communication between a first SR and an independent SN may be implemented by encapsulating an underlay network header in front of a service header of a service routing packet in the prior art.

Figure 8C:
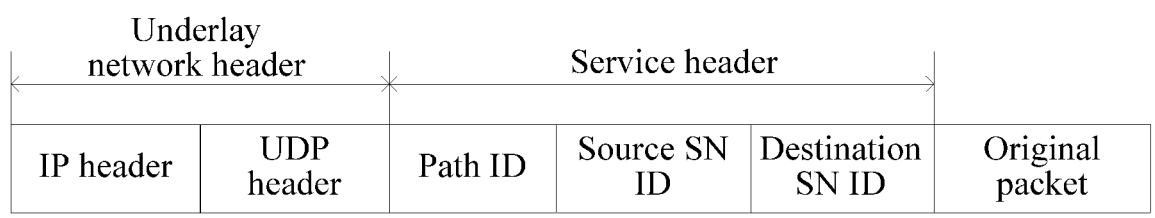
FIG. 8C is a format of a service routing packet that is implemented in a UDP manner by an underlay network.

FIG. 8C is a format of a service routing packet that is implemented in a UDP manner by an underlay network. As shown in FIG. 8C, the format of the service routing packet that is implemented in the UDP manner by the underlay network includes the following fields: UDP header: a UDP encapsulation header of the underlay network, where a specific source UDP port number and a specific destination UDP port number are used to identify whether that a UDP payload (payload) is a service routing packet carrying a service header; and IP header: an IP encapsulation header of the underlay network, where a source IP address in the IP header is an IP address of an SN or an SR that sends the packet, and a destination IP address is an IP address of an SN or an SR that receives the packet.

It should be noted that the underlay network is not limited to being implemented in a UDP manner, and implementation of the underlay network by using an IP network, the Ethernet, a multi-protocol label switching (MPLS) network, and various tunnel technologies may be supported.

Figure 8D:
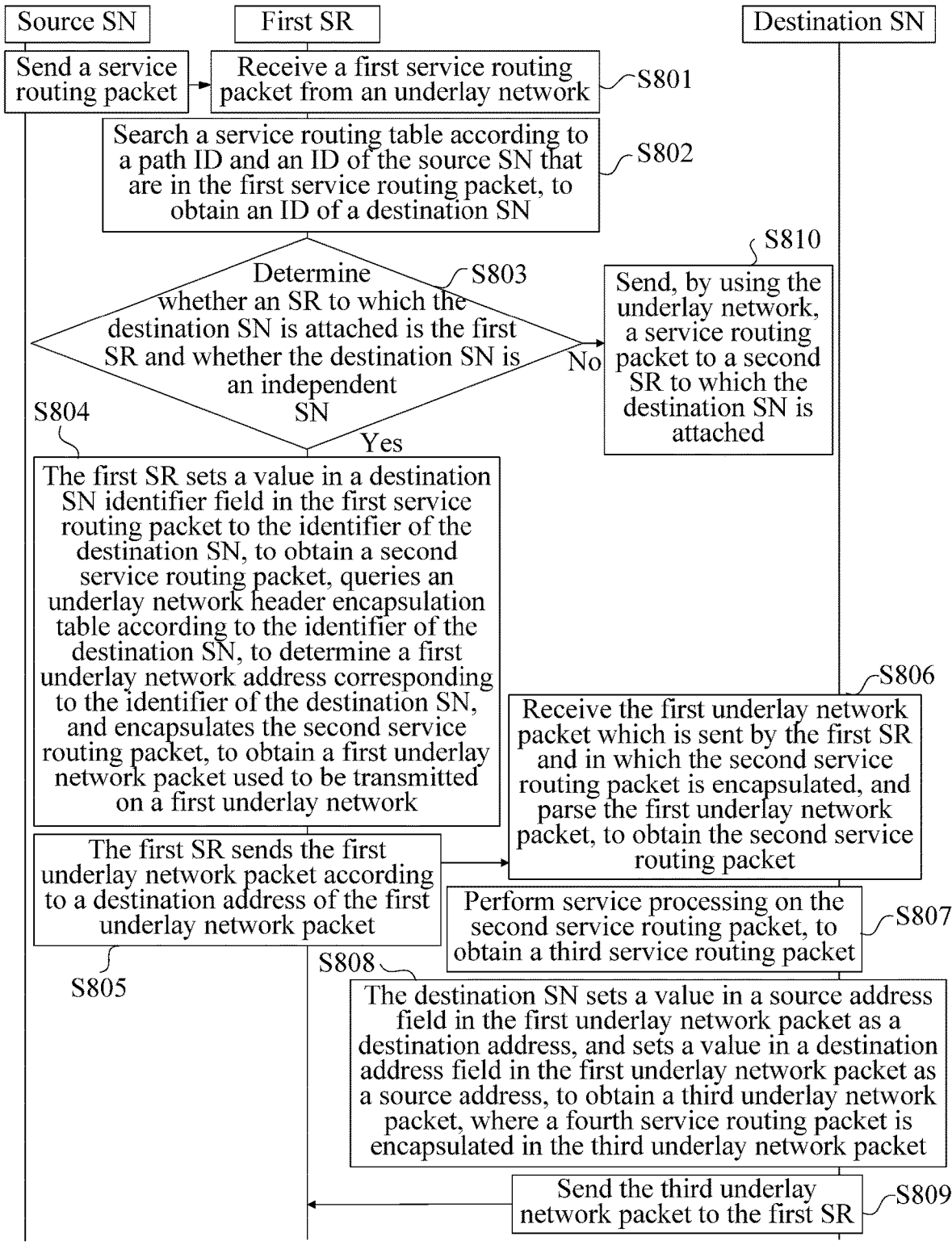
FIG. 8D is a schematic flowchart of Embodiment 7 of the service routing packet processing method according to the present application.

FIG. 8D is a schematic flowchart of Embodiment 7 of the service routing packet processing method according to the present application. As shown in FIG. 8D, this embodiment describes a process in which a first SR and an independent SN implement communication by using an underlay network, and includes:

S801: A first SR receives, from an underlay network, a first service routing packet sent by a source SN.

S802: The first SR searches a service routing table according to a path ID and an ID of the source SN that are in the first service routing packet, to obtain an ID of a destination SN.

S803: The first SR determines whether an SR to which the destination SN is attached is the first SR and whether the destination SN is an independent SN, and if yes, perform S804; or otherwise, perform S810.

S804: The first SR sets a value in a destination SN identifier field in the first service routing packet to the identifier of the destination SN, to obtain a second service routing packet, queries an underlay network header encapsulation table according to the identifier of the destination SN, to determine a first underlay network address corresponding to the identifier of the destination SN, and encapsulates the second service routing packet, to obtain a first underlay network packet used to be transmitted on a first underlay network.

S805: The first SR sends the first underlay network packet according to a destination address of the first underlay network packet.

S806: The destination SN receives the first underlay network packet that is sent by the first SR and in which the second service routing packet is encapsulated, and parses the first underlay network packet, to obtain the second service routing packet.

S807: The destination SN performs service processing on the second service routing packet, to obtain a third service routing packet.

S808: The destination SN sets a value in a source address field in the first underlay network packet as a destination address, and sets a value in a destination address field in the first underlay network packet as a source address, to obtain a third underlay network packet, where a fourth service routing packet is encapsulated in the third underlay network packet.

S809: The destination SN sends the third underlay network packet to the first SR.

S810: The first SR sends, by using the underlay network, a service routing packet to a second SR to which the destination SN is attached.

Specifically, if the first SR determines that the SR to which the destination SN is attached is not the first SR but the second SR, the first SR sends, by using the underlay network, the service routing packet to the second SR to which the destination SN is attached, and if the destination SN is not an independent SN, the second SR sends, by using an internal communication mechanism, the service routing packet to the destination SN for processing; or if the destination SN is an independent SN, the second SR sends, by using the underlay network, the service routing packet to the destination SN for processing.

Figures 8E, 8F:
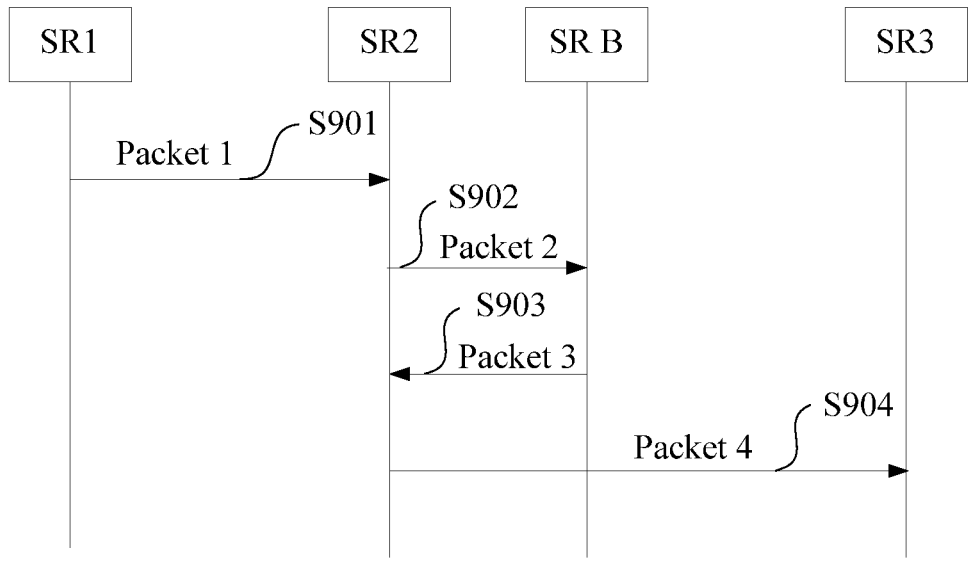
FIG. 8E is a schematic diagram of sending and receiving of service routing packets between SRs and an SN in Embodiment 7 of the service routing packet processing method according to the present application.
FIG. 8F is a schematic diagram of key information of packets in FIG. 8E.

FIG. 8E is a schematic diagram of sending and receiving of service routing packets between SRs and an SN in Embodiment 7 of the service routing packet processing method according to the present application. FIG. 8F is a schematic diagram of key information of packets in FIG. 8E.

The following describes the service routing packet processing method in Embodiment 7 in detail with reference to FIG. 8A, FIG. 8E, and FIG. 8F. In a scenario for implementing service routing of SN A→SN B→SN D, a processing process of the SR2 and the SN B includes the following steps.

S901: An SR2 receives, from an underlay network, a service routing packet 1 (packet 1 shown in FIG. 8F) that is processed by an SN A and sent by an SR1.

After receiving the packet 1, the SR2 searches a service routing table (as shown in Table 1) of the SR2 according to a path ID (55) and a source SN ID (A) in the packet 1, to obtain a destination SN ID (B) according to a table search result, and sets a destination SN field of a service packet by using the destination SN ID (B); the SR2 determines that an SR to which the destination SN B is attached is the SR2 and the SN B is an independent SN, and the SR searches an underlay network header encapsulation table (as shown in Table 2) according to the destination SN B, to find an underlay network address (2.2.2.2) of the destination SN, uses this network address as a destination address of the underlay network, generates an underlay network header, and encapsulates a service routing packet (for example, packet 2 in FIG. 8F).

S902: The SR2 sends a packet 2 to an SN B by using the underlay network.

After the SN B receives, from the underlay network, the packet 2 sent by the SR2, a service processing module of the SN B performs service processing on the packet; for the packet on which the service processing has been performed, the SN B updates content of a source SN ID field in a service header according to content of a destination SN ID (B) field in the service header; and the SN B exchanges content of a source address (2.2.2.1) field and content of a destination address (2.2.2.2) field in an underlay network header of the packet, and encapsulates a service routing packet (for example, packet 3 shown in FIG. 8F) by using a newly generated underlay network header.

S903: The SN B sends a packet 3 to the SR2 by using the underlay network.

The SR2 receives, from the underlay network, the packet 3 that is processed by the SN B and sent by the SN B, searches the service routing table (as shown in Table 1) of the SR2 according to a source SN ID (B) in the packet, to obtain a destination SN ID (D) from a table search result, and sets a destination SN field of the service packet by using the destination SN ID (D). The SR2 determines that an SR to which the destination SN D is attached is an SR3, and the SR2 searches an underlay network header encapsulation table (as shown in Table 2) according to the destination SN ID (D), to find an underlay network address (3.3.3.1) of the SR (3) to which the destination SN (D) is attached, uses this network address as a destination address of the underlay network, generates an underlay network header, and encapsulates a service routing packet to generate a packet 4 (for example, packet 4 shown in FIG. 8F).

S904: The SR2 sends a packet 4 to an SR3 by using the underlay network.

TABLE 1

| Table search keyword | | Table search result |
|---|---|---|
| Path ID | Source SN ID | Destination SN ID |
| 55 | A | B |
| 55 | B | D |

TABLE 2

| Destination SN ID | Destination SR/SN IP |
|---|---|
| B | 2.2.2.2 |
| D | 3.3.3.1 |

It should be noted that identifiers A B C D of SN IDs herein are only for the convenience of description, and in actual implementation, it is supported to implement SN IDs by means of digital coding on SNs.

It should be noted that the underlay network is not limited to being implemented in a UDP manner, and implementation of the underlay network by using an IP network, the Ethernet, an MPLS network, and various tunnel technologies may be supported.

If the underlay network in this embodiment is the Internet, content of the underlay network header encapsulation table is IP addresses of SNs;

if the underlay network in this embodiment is the Ethernet, content of the underlay network header encapsulation table is MAC addresses of SNs; or if the underlay network in this embodiment is an MPLS network, content of the underlay network header encapsulation table is MPLS labels of SNs.

In the service routing packet processing method provided in this embodiment, an underlay network is used to forward service routing packets between an SR and an independent SN, so that support of an independent SN for service routing can be implemented, thereby solving a problem in the prior art that an independent SN cannot support service routing.

Figure 9A:
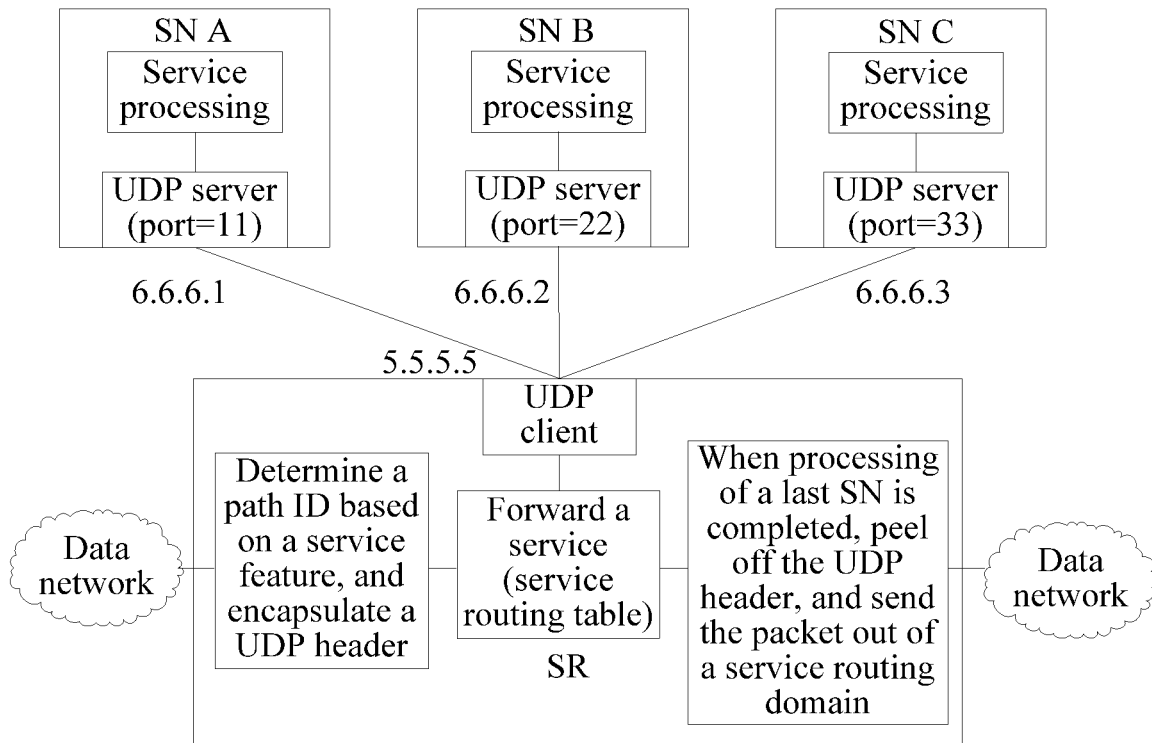
FIG. 9A is a schematic diagram of a principle for implementing a service routing forwarding mechanism of Embodiment 8 of a service routing packet processing method according to the present application.

FIG. 9A is a schematic diagram of a principle for implementing a service routing forwarding mechanism of Embodiment 8 of a service routing packet processing method according to the present application. As shown in FIG. 9A, an SN A, an SN B, and an SN C are all independent SNs, and are all attached to a same SR. A difference between the embodiment shown in FIG. 9A to FIG. 9E and the embodiment shown in FIG. 8A to FIG. 8F lies in that: in the embodiment shown in FIG. 9A to FIG. 9E, a service routing packet for communication between an SN and an SR is implemented by encapsulating an IP header and a UDP header outside an original data packet. Such a service routing mechanism is that: the SR serves as a UDP client (client) to implement communication with the SN that serves as a UDP server (server).

In this embodiment, service header information of a service routing packet, namely, path ID information and SN ID information may be mapped to IP header information and UDP header information, and a specific mapping method is:

representing the path ID information by using a UDP port number of the SR, representing the SN ID information by using an IP address of the SN, or by using a UDP port number of the SN, or by using the IP address and the UDP port number of the SN.

Figure 9B:
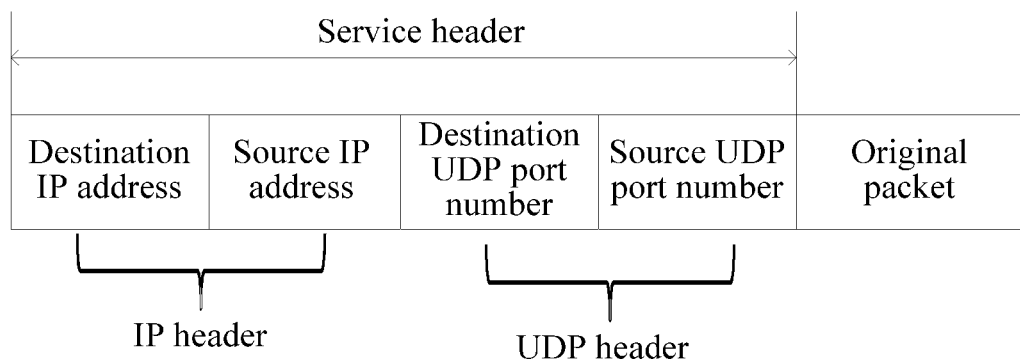
FIG. 9B is a format of a service routing packet in which an IP header and a UDP header are encapsulated.

FIG. 9B is a format of a service routing packet in which an IP header and a UDP header are encapsulated. As shown in FIG. 9B, a service header of the service routing packet in this embodiment may include an IP header and a UDP header, where the IP header includes a destination IP address and a source IP address, the UDP header includes a destination UDP port number and a source UDP port number.

Figure 9C:
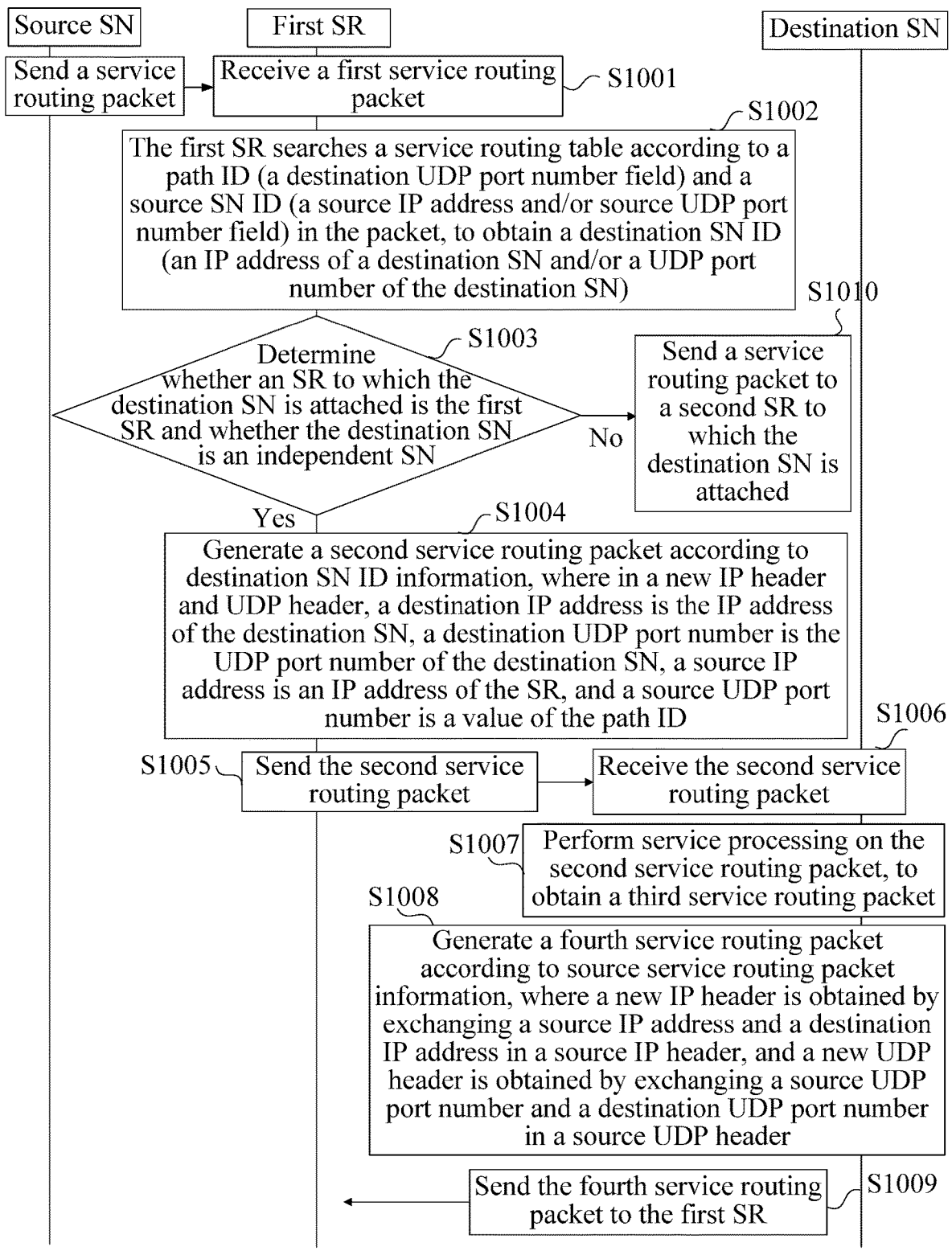
FIG. 9C is a schematic flowchart of Embodiment 7 of the service routing packet processing method according to the present application.

FIG. 9C is a schematic flowchart of Embodiment 7 of the service routing packet processing method according to the present application. As shown in FIG. 9C, this embodiment describes a process in which a first SR and an independent SN implement communication by encapsulating an IP header and a UDP header outside an original data packet, and includes the following steps.

S1001: A first SR receives a first service routing packet sent by a source SN.

S1002: The first SR searches a service routing table according to a path ID (a destination UDP port number field) and a source SN ID (a source IP address and/or source UDP port number field) in the packet, to obtain a destination SN ID (an IP address of a destination SN and/or a UDP port number of the destination SN).

S1003: The first SR determines whether an SR to which the destination SN is attached is the first SR and whether the destination SN is an independent SN, and if yes, perform S1004; or otherwise, perform S1010.

S1004: The first SR generates a second service routing packet according to destination SN ID information, where in a new IP header and UDP header, a destination IP address is the IP address of the destination SN, a destination UDP port number is the UDP port number of the destination SN, a source IP address is an IP address of the SR, and a source UDP port number is a value of the path ID.

S1005: The first SR sends the second service routing packet.

S1006: An SN receives the second service routing packet.

S1007: A service processing module of the SN performs service processing on the packet, to obtain a third service routing packet.

S1008: The SN generates a fourth service routing packet according to original service routing packet information, where a new IP header is obtained by exchanging a source IP address and a destination IP address in the original IP header, and a new UDP header is obtained by exchanging a source UDP port number and a destination UDP port number in the original UDP header.

S1009: The SN sends the fourth service routing packet to the first SR.

S1010: The first SR sends a service routing packet to a second SR to which the destination SN is attached.

FIG. 9D is a schematic diagram of sending and receiving of service routing packets between an SR and SNs in Embodiment 8 of the service routing packet processing method according to the present application. FIG. 9E is a schematic diagram of key information of packets in FIG. 9D.

The following describes the service routing packet processing method in this embodiment in detail with reference to FIG. 9A, FIG. 9D, and FIG. 9E. In a scenario for implementing service routing of SN A→SN B→SN C, a processing process of the SR and the SN B includes the following steps.

S1011: An SR receives a service routing packet (for example, packet 5 shown in FIG. 9E) that has been processed by an SN A.

The SR searches an entry 1 in service routing table entries (as shown in Table 3) of the SR according to a path ID (destination UDP port number=1234) and a source SN ID (source IP address=6.6.6.1 and source UDP port number=11) in the packet, to obtain that a destination SN is an SN B, where an SN ID of the SN B is represented in the following form: IP address of SN B=6.6.6.2 and UDP port number of SN B=22; and the SR determines that an SR to which the destination SN B is attached is the SR itself and the SN B is an independent SN, and the SR generates a new service routing packet according to destination SN ID information, where in a new IP header and a new UDP header, a destination IP address is the IP address (6.6.6.2) of the destination SN, and a destination UDP port number is the UDP port number (22) of the destination SN, a source IP address is the IP address (5.5.5.5) of the SR, and a source UDP port number is a value of the path ID (1234).

S1102: The SR sends a service routing packet (for example, packet 6 shown in FIG. 9E) to an SN B.

After the SN B receives the packet 6 sent by the SR, a service processing module of the SN B performs service processing on the packet; the SN B generates a new service routing packet according to original service routing packet information, where a new IP header is obtained by exchanging the source IP address (5.5.5.5) and the destination IP address (6.6.6.2) in the original IP header, and a new UDP header is obtained by exchanging the source UDP port number (1234) and the destination UDP port number (22) in the original UDP header, to obtain a service routing packet (for example, packet 7 shown in FIG. 9E).

S1103: The SN B sends a packet 7 to the SR.

After receiving the service packet sent by the SN B, the SR performs the processing in S1101 again, to obtain a new service routing packet (for example, packet 8 shown in FIG. 9E).

S1104: The SR sends a packet 8 to an SN C.

TABLE 3

| Table search keyword | | | Table search result | |
|---|---|---|---|---|
| Path ID | Source SN ID | | Destination SN ID | |
| Destination UDP port number | Source IP address | UDP port number | Destination SN IP address | Destination SN UDP port number |
| Entry 1 | 1234 | 6.6.6.1 | 11 | 6.6.6.2 | 22 |
| Entry 2 | 1234 | 6.6.6.2 | 22 | 6.6.6.3 | 33 |
| Entry 3 | 1234 | 6.6.6.3 | 33 | Exit | |

It should be noted that, identifiers A B C D of SN IDs herein are only for the convenience of description, and in actual implementation, it is supported to implement SN IDs by means of digital coding on SNs.

In the service routing packet processing method provided in this embodiment, an SR and an independent SN implement sending and receiving of service routing packets by encapsulating an IP header and a UDP header outside an original data packet, so that support of an independent SN for service routing can be implemented, thereby solving a problem in the prior art that an independent SN cannot support service routing.

FIG. 10 is a schematic structural diagram of Embodiment 1 of a service routing packet processing apparatus according to the present application. As shown in FIG. 10, the service routing packet processing apparatus in this embodiment may be a service router, including: a receiving module 11, a determining module 12, a generating module 13, and a sending module 14, where the receiving module 11 is configured to receive a first service routing packet; the determining module 12 is configured to query a service routing table according to path identification information and identification information of a source SN that are carried in the first service routing packet, to determine identification information of a destination SN, where the service routing table includes a correspondence between the path identification information, the identification information of the source SN, and the identification information of the destination SN; the generating module 13 is configured to generate a second service routing packet according to the identification information of the destination SN and the first service routing packet; and the sending module 14 is configured to send the second service routing packet.

Further, the determining module 12 is further configured to: before the second service routing packet is generated according to the identification information of the destination SN, determine, according to the identification information of the destination SN, that an SR to which the destination SN is attached is the first SR and the destination SN is an independent SN.

The apparatus in this embodiment may be configured to execute the technical solution of the method embodiment shown in FIG. 2, and has a similar implementation principle and technical effect as the method embodiment, and details are not provided again herein.

Further, the path identification information is a value in a path identifier field in the first service routing packet, and the identification information of the source SN is a value in a source SN identifier field in the first service routing packet;

the generating module 13 is specifically configured to:

set a value in a destination SN identifier field in the first service packet to an identifier of the destination SN, to obtain the second service routing packet; and the sending module 14 is specifically configured to:

query an underlay network header encapsulation table according to the identifier of the destination SN, to determine a first underlay network address corresponding to the identifier of the destination SN, where the first underlay network address is an address of a first underlay network, and the underlay network header encapsulation table includes a correspondence between the identifier of the destination SN and the first underlay network address;

encapsulate the second service routing packet, to obtain a first underlay network packet used to be transmitted on the first underlay network, where a destination address of the first underlay network packet is the first underlay network address; and send the first underlay network packet according to the destination address of the first underlay network packet.

Optionally, the first underlay network is an underlay network on which the destination SN is located.

Optionally, the first underlay network is a network that runs the UDP, the Internet, or the Ethernet.

Optionally, the receiving module 11 is specifically configured to: receive a second underlay network packet in which the first service routing packet is encapsulated, where a packet type of the second underlay network packet is the same as a packet type of the first underlay network packet; and parse the second underlay network packet, to obtain the first service routing packet.

The apparatus in this embodiment may be configured to execute the technical solution of the method embodiment shown in FIG. 3, and has a similar implementation principle and technical effect as the method embodiment, and details are not provided again herein.

Further, the path identification information is a destination UDP port number, the identification information of the source SN is a source IP address, and the identification information of the destination SN is an IP address of the destination SN; and the generating module 13 is further configured to: determine a UDP port number of the destination SN, an IP address of the first SR, and a UDP port number of the first SR; and set a destination IP address of the first service routing packet to the IP address of the destination SN, set a destination UDP port number of the first service routing packet to the UDP port number of the destination SN, set a source IP address of the first service routing packet to the IP address of the first SR, and set a source UDP port number of the first service routing packet to the UDP port number of the first SR, to generate the second service routing packet.

Alternatively, the path identification information is a destination UDP port number, the identification information of the source SN is a source UDP port number, and the identification information of the destination SN is a UDP port number of the destination SN; and the generating module 13 is further configured to: determine an IP address of the destination SN, an IP address of the first SR, and a UDP port number of the first SR; and set a destination IP address of the first service routing packet to the IP address of the destination SN, set a destination UDP port number of the first service routing packet to the UDP port number of the destination SN, set a source IP address of the first service routing packet to the IP address of the first SR, and set a source UDP port number of the first service routing packet to the UDP port number of the first SR, to generate the second service routing packet.

Alternatively, the path identification information is a destination UDP port number, the identification information of the source SN is a source IP address and a source UDP port number, and the identification information of the destination SN is an IP address of the destination SN and a UDP port number of the destination SN; and the generating module 13 is further configured to: determine an IP address of the first SR and a UDP port number of the first SR; and set a destination IP address of the first service routing packet to the IP address of the destination SN, set a destination UDP port number of the first service routing packet to the UDP port number of the destination SN, set a source IP address of the first service routing packet to the IP address of the first SR, and set a source UDP port number of the first service routing packet to the UDP port number of the first SR, to generate the second service routing packet.

Optionally, the sending module 14 is further configured to send the second service routing packet according to a destination IP address of the second service routing packet.

The apparatus in this embodiment may be configured to execute the technical solution of the method embodiment shown in FIG. 4, and has a similar implementation principle and technical effect as the method embodiment, and details are not provided again herein.

Figure 12:
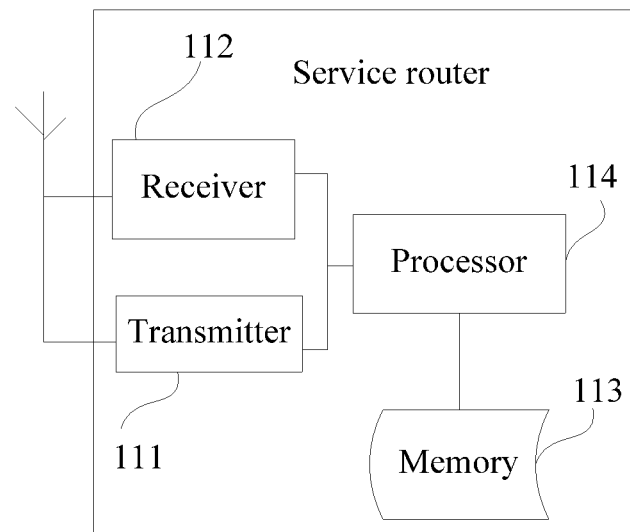
FIG. 12 is a schematic structural diagram of Embodiment 3 of a service routing packet processing apparatus according to the present application.

FIG. 12 is a schematic structural diagram of Embodiment 3 of a service routing packet processing apparatus according to the present application. As shown in FIG. 12, the service routing packet processing apparatus in this embodiment may be a service router, including a transmitter 111, a receiver 112, a memory 113, and a processor 114 that is separately connected to the transmitter 111, the receiver 112, and the memory 113. Certainly, the service routing packet processing apparatus may further include general parts such as an antenna, a baseband processing part, a medium radio frequency processing part, and an input/output apparatus, which are not limited by this embodiment of the present application herein.

The memory 113 stores a group of program code, and the processor 114 is configured to invoke the program code stored in the memory 113, to perform the following operations: receiving, by a first SR, a first service routing packet; querying, by the first SR, a service routing table according to path identification information and identification information of a source SN that are carried in the first service routing packet, to determine identification information of a destination SN, where the service routing table includes a correspondence between the path identification information, the identification information of the source SN, and the identification information of the destination SN; generating, by the first SR, a second service routing packet according to the identification information of the destination SN and the first service routing packet; and sending, by the first SR, the second service routing packet.

The apparatus in this embodiment may be configured to execute the technical solution of the method executed by the service router in the method embodiments that are shown in FIG. 2 to FIG. 4 or the method embodiments that are shown in FIG. 8D, FIG. 8E, FIG. 9C, and FIG. 9D, and has a similar implementation principle and technical effect as the method embodiments, and details are not provided again herein.

Figure 11:
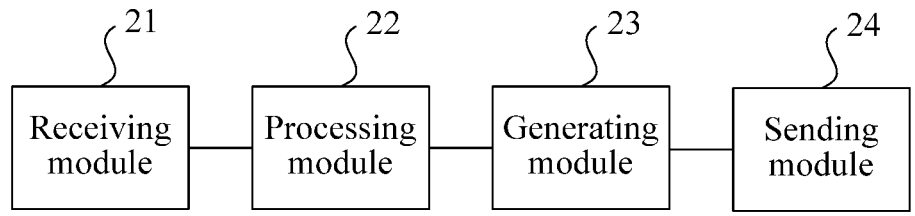
FIG. 11 is a schematic structural diagram of Embodiment 2 of a service routing packet processing apparatus according to the present application.

FIG. 11 is a schematic structural diagram of Embodiment 2 of a service routing packet processing apparatus according to the present application. As shown in FIG. 11, the service routing packet processing apparatus in this embodiment may be a service node, including: a receiving module 21, a processing module 22, a generating module 23, and a sending module 24, where the receiving module 21 is configured to receive a second service routing packet sent by a first SR; the processing module 22 is configured to perform service processing on the second service routing packet, to obtain a third service routing packet; the generating module 23 is configured to generate a fourth service routing packet according to the third service routing packet; and the sending module 24 is configured to send the fourth service routing packet to the first SR.

The apparatus in this embodiment may be configured to execute the technical solution of the method embodiment shown in FIG. 5, and has a similar implementation principle and technical effect as the method embodiment, and details are not provided again herein.

Further, the receiving module 21 is specifically configured to: receive a first underlay network packet that is sent by the first SR and in which the second service routing packet is encapsulated, where the first underlay network packet is a packet of a first underlay network; and parse the first underlay network packet, to obtain the second service routing packet; the generating module 23 is specifically configured to: set a value in a source SN identifier field in the third service routing packet as an identifier of a destination SN, to obtain the fourth service routing packet; and the sending module 24 is specifically configured to: set a value in a source address field in the first underlay network packet as a destination address, and set a destination address field in the first underlay network packet as a source address, to obtain a third underlay network packet, where the fourth service routing packet is encapsulated in the third underlay network packet, and a packet type of the third underlay network packet is the same as a packet type of the first underlay network packet; and send the third underlay network packet to the first SR.

Optionally, the first underlay network is a network that runs the UDP, the Internet, or the Ethernet.

The apparatus in this embodiment may be configured to execute the technical solution of the method embodiment shown in FIG. 6, and has a similar implementation principle and technical effect as the method embodiment, and details are not provided again herein.

Further, the generating module 23 is specifically configured to: set a source IP address in the third service routing packet as a destination IP address, set a destination IP address in the third service routing packet as a source IP address, set a source UDP port number in the third service routing packet as a destination UDP port number, and set a destination UDP port number in the third service routing packet as a source UDP port number, to generate the fourth service routing packet.

The apparatus in this embodiment may be configured to execute the technical solution of the method embodiment shown in FIG. 7, and has a similar implementation principle and technical effect as the method embodiment, and details are not provided again herein.

Figure 13:
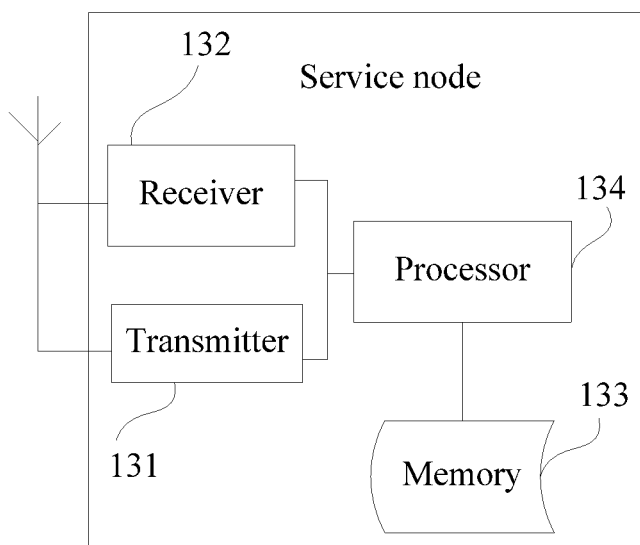
FIG. 13 is a schematic structural diagram of Embodiment 4 of a service routing packet processing apparatus according to the present application.

FIG. 13 is a schematic structural diagram of Embodiment 4 of a service routing packet processing apparatus according to the present application. As shown in FIG. 13, the service routing packet processing apparatus in this embodiment may be a service node, including a transmitter 131, a receiver 132, a memory 133, and a processor 134 that is separately connected to the transmitter 131, the receiver 132, and the memory 133. Certainly, the service routing packet processing apparatus may further include general parts such as an antenna, a baseband processing part, a medium radio frequency processing part, and an input/output apparatus, which are not limited by this embodiment of the present application herein.

The memory 133 stores a group of program code, and the processor 134 is configured to invoke the program code stored in the memory 133, to perform the following operations: receiving, by an SN, a second service routing packet sent by a first SR; performing, by the SN, service processing on the second service routing packet, to obtain a third service routing packet; generating, by the SN, a fourth service routing packet according to the third service routing packet; and sending, by the SN, the fourth service routing packet to the first SR.

The apparatus in this embodiment may be configured to execute the technical solution of the method executed by the service node in the method embodiments that are shown in FIG. 5 to FIG. 7 or the method embodiments that are shown in FIG. 8D, FIG. 8E, FIG. 9C, and FIG. 9D, and has a similar implementation principle and technical effect as the method embodiments, and details are not provided again herein.

Figure 14:
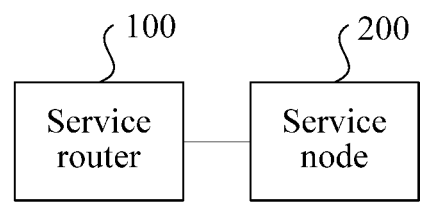
FIG. 14 is a schematic structural diagram of Embodiment 1 of a network system according to the present application.

FIG. 14 is a schematic structural diagram of Embodiment 1 of a network system according to the present application. As shown in FIG. 14, the network system in this embodiment may include: any service router 100 in the embodiment shown in FIG. 10 or FIG. 11 and any service node 200 in the embodiment shown in FIG. 12 or FIG. 13.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method, comprising:
   receiving, by a service node (SN), a first service routing packet from a service router (SR), wherein the first service routing packet comprises path identification information and identification information of the SN;
   performing, by the SN, service processing on the first service routing packet and obtaining a second service routing packet, wherein the second service routing packet comprises, as a result of the service processing performed on the first service routing packet, the path identification information and identification information of a destination SN, wherein the destination SN is a next SN of a path identified by the path identification information, and wherein the destination SN is attached to the SR; and
   sending, by the SN, the second service routing packet to the SR.

2. The method according to claim 1, wherein the receiving the first service routing packet comprises:
   receiving, by the SN, a first underlay network packet from the SR, wherein the first underlay network packet comprises the first service routing packet, and wherein the first underlay network packet is a packet of a first underlay network; and
   parsing, by the SN, the first underlay network packet and obtaining the first service routing packet according to the first underlay network packet.

3. The method according to claim 2, further comprising:
   obtaining a second underlay network packet by setting, by the SN, a value in a source address field of the first underlay network packet as a destination address, wherein the second underlay network packet comprises the second service routing packet, and wherein the second underlay network packet is a packet of a second underlay network; and
   sending, by the SN, the second underlay network packet to the SR.

4. The method according to claim 3, wherein a type of the first underlay network and a type of the second underlay network are the same.

5. The method according to claim 1, wherein the obtaining the second service routing packet comprises:
   setting, by the SN, a source Internet Protocol (IP) address of the first service routing packet as a destination IP address; and
   setting a source user datagram protocol (UDP) port number of the first service routing packet as a destination UDP port number.

6. A service node (SN), comprising:
   a receiver;
   a transmitter;
   a processor; and
   a non-transitory computer-readable storage medium storing a program to be executed by the processor, the program including instructions to:
   receive, through the receiver, a first service routing packet from a service router (SR), wherein the first service routing packet comprises path identification information and identification information of the SN;
   perform service processing on the first service routing packet and obtain a second service routing packet, wherein the second service routing packet comprises as a result of the service processing performed on the first service routing packet, the path identification information and identification information of a destination SN, wherein the destination SN is a next SN of a path identified by the path identification information, and wherein the destination SN is attached to the SR; and
   cause the transmitter to send the second service routing packet to the SR.

7. The service node according to claim 6, wherein the instructions to receive the first service routing packet include instructions to:
   receive a first underlay network packet from the SR, wherein the first underlay network packet comprises the first service routing packet, and wherein the first underlay network packet is a packet of a first underlay network; and
   parse the first underlay network packet and obtain the first service routing packet according to the first underlay network packet.

8. The service node according to claim 7, wherein the program further includes instructions to:
   obtain a second underlay network packet by setting a value in a source address field of the first underlay network packet as a destination address, and wherein the second underlay network packet comprises the second service routing packet, and wherein the second underlay network packet is a packet of a second underlay network; and
   send the second underlay network packet to the SR.

9. The service node according to claim 8, wherein a type of the first underlay network and a type of the second underlay network are the same.

10. The service node according to claim 6, wherein the instructions to obtain the second service routing packet include instructions to:
set a source Internet Protocol (IP) address of the first service routing packet as a destination IP address; and
set a source user datagram protocol (UDP) port number of the first service routing packet as a destination UDP port number.

11. A network system comprising:
a service router (SR); and
a service node (SN) in signal communication with the SR, wherein the SN is configured to:
receive a first service routing packet from the SR, wherein the first service routing packet comprises path identification information and identification information of a source SN;
perform service processing on the first service routing packet and obtain a second service routing packet, wherein the second service routing packet comprises, as a result of the service processing performed on the first service routing packet, the path identification information and identification information of a destination SN, wherein the destination SN is a next SN of a path identified by the path identification information, and wherein the destination SN is attached to the SR; and
send the second service routing packet to the SR.

12. The network system according to claim 11, wherein the SN is part of a service, wherein the service comprises a plurality of SNs and a sequence in which SNs of the plurality of SNs process packets, and wherein the plurality of SNs includes the SN.

13. The network system according to claim 12, wherein the SR is configured to cause data packets to pass through the plurality of SNs according to the sequence.

14. The network system according to claim 11, wherein the SN being configured to receive the first service routing packet comprises the SN being configured to:
receive a first underlay network packet from the SR, wherein the first underlay network packet comprises the first service routing packet, and wherein the first underlay network packet is a packet of a first underlay network; and
parse the first underlay network packet and obtain the first service routing packet according to the first underlay network packet.

15. The network system according to claim 14, wherein the SN is further configured to:
obtain a second underlay network packet by setting a value in a source address field of the first underlay network packet as a destination address, and wherein the second underlay network packet comprises the second service routing packet, and wherein the second underlay network packet is a packet of a second underlay network; and
send the second underlay network packet to the SR.

16. The service node according to claim 15, wherein a type of the first underlay network and a type of the second underlay network are the same.

17. The network system according to claim 11, wherein the SN being configured to obtain a second service routing packet comprises the SN being configured to:
set a source Internet Protocol (IP) address of the first service routing packet as a destination IP address; and
set a source user datagram protocol (UDP) port number of the first service routing packet as a destination UDP port number.

* * * * *